(12) United States Patent  
Ono et al.

(10) Patent No.: US 7,050,898 B2  
(45) Date of Patent: May 23, 2006

(54) VEHICLE DRIVING FORCE CONTROL

(75) Inventors: Tatsuya Ono, Kanagawa (JP); Takeshi Ishizu, Tokyo (JP); Hiroyuki Ashizawa, Kanagawa (JP); Akira Higashimata, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/244,514

(22) Filed: Sep. 17, 2002

(65) Prior Publication Data

US 2003/0074124 A1 Apr. 17, 2003

(30) Foreign Application Priority Data

Sep. 26, 2001 (JP) .............................. 2001-294334

(51) Int. Cl.  
*G06F 19/00* (2006.01)

(52) U.S. Cl. .............................. 701/70; 701/53; 701/54; 477/120; 477/121

(58) Field of Classification Search ................. 701/70, 701/53, 54, 79, 80, 84, 85, 93, 94, 95; 477/120, 477/121, 115, 118, 110, 181  
See application file for complete search history.

(56) References Cited

U.S. PATENT DOCUMENTS

| | | | |
|---|---|---|---|
| 4,754,834 A * | 7/1988 | Ozaki et al. ................. 180/233 |
| 4,811,713 A * | 3/1989 | Shimada et al. ............. 123/399 |
| 5,245,542 A * | 9/1993 | Itoh et al. ....................... 701/90 |
| 5,465,208 A * | 11/1995 | Mochizuki et al. ........... 701/70 |
| 5,765,117 A * | 6/1998 | Horiguchi ..................... 701/51 |
| 5,902,210 A * | 5/1999 | Kobayashi et al. ......... 477/118 |
| 5,944,392 A * | 8/1999 | Tachihata et al. ........... 303/112 |
| 6,062,659 A * | 5/2000 | Matsuda ..................... 303/160 |
| 6,306,062 B1* | 10/2001 | Toukura et al. ............. 477/107 |
| 6,308,128 B1 | 10/2001 | Nishijima et al. |
| 6,397,140 B1* | 5/2002 | Minowa et al. .............. 701/96 |
| 6,434,472 B1* | 8/2002 | Minowa et al. .............. 701/96 |

FOREIGN PATENT DOCUMENTS

| JP | 11-20496 A | 1/1999 |
|---|---|---|
| JP | 2000-205015 A | 7/2000 |
| JP | 2000-255286 A | 9/2000 |
| JP | 2000-255287 A | 9/2000 |
| JP | 2000-265869 A | 9/2000 |
| JP | 2001-138768 A | 5/2001 |
| JP | 2001-173474 A | 6/2001 |

\* cited by examiner

*Primary Examiner*—Gertrude A. Jeanglaude  
(74) *Attorney, Agent, or Firm*—Foley & Lardner LLP

(57) ABSTRACT

In a vehicle driving force control apparatus for controlling a driving force of the vehicle to achieve a target acceleration or a target vehicle speed, a running resistance estimating section calculates an estimated running resistance. A target acceleration modifying section modifies the target acceleration with the estimated running resistance and thereby decreases the target acceleration with increase in the estimated running resistance.

16 Claims, 20 Drawing Sheets

VEHICLE DRIVING FORCE CONTROL

BACKGROUND OF THE INVENTION

The present invention relates to technique for controlling a vehicle driving force to achieve a desired vehicle acceleration or a desired vehicle speed responsive to a driver's accelerator input or accelerator pedal operation.

Published Japanese Patent Application Publication No. 2000-205015 shows a driving force control system arranged to calculate a target acceleration/deceleration from an accelerator pedal depression quantity, and to control an engine throttle opening to achieve the target.

SUMMARY OF THE INVENTION

When the accelerator pedal is released in the driving force control system arranged to control the driving force to achieve the desired target acceleration determined from the accelerator pedal depression quantity, however, the actual vehicle deceleration is produced to the same target acceleration without discrimination of an uphill road state or a downhill road state from a flat road state.

It is an object of the present invention to provide vehicle driving force control apparatus and/or process capable of controlling vehicle deceleration adequately in accordance with the slope of a road without causing unnatural feeling.

According to the present invention, a vehicle driving force control apparatus for a vehicle, comprises: an actuating section to control a driving force of the vehicle to achieve a target acceleration; a running resistance estimating section to calculate an estimated running resistance; and a target acceleration modifying section to modify the target acceleration with the estimated running resistance and thereby to decrease the target acceleration with increase in the estimated running resistance.

According to another aspect of the present invention, a vehicle driving force control apparatus for controlling a driving force of a vehicle: first means for calculating a target acceleration in accordance with a driver's accelerator input: second means for calculate an estimated running resistance; third means for calculating a modified target acceleration by modifying the target acceleration determined by the first means, with the estimated running resistance so that the modified target acceleration decreases as the estimated running resistance increases; and fourth means for controlling the driving force of the vehicle so as to achieve the modified target acceleration. According to still another aspect of the present invention, a vehicle driving force control process comprises: calculating a target acceleration in accordance with a driver's accelerator input: determining an estimated running resistance; modifying the target acceleration with the estimated running resistance, to determine a modified target acceleration such that the modified target acceleration decreases as the estimated running resistance increases; and controlling the driving force of the vehicle so as to achieve the modified target acceleration.

DETAILED DESCRIPTION OF THE INVENTION

Figure 1:
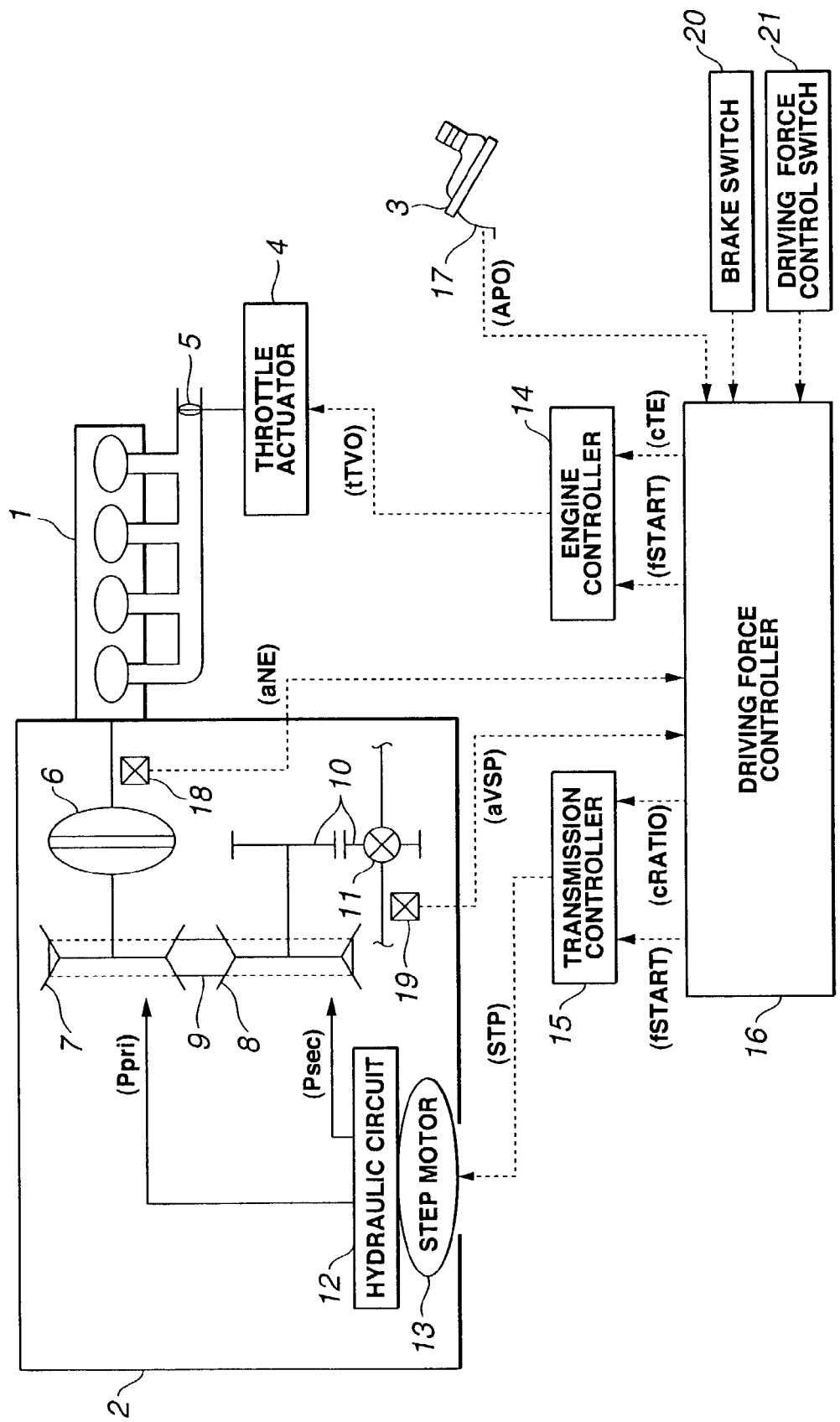
FIG. 1 is a schematic view showing a vehicle equipped with a driving force control apparatus according to one embodiment of the present invention.

FIG. 1 shows a vehicle driving force control apparatus according to one embodiment of the present invention. The vehicle of the example shown in FIG. 1 has a power train of an engine 1 and a continuously-variable transmission 2.

A throttle actuator 4 is provided in connection with engine 1. Engine 1 of this example is an gasoline engine. In this example, however, a throttle valve 5 of engine 1 is not linked mechanically with an accelerator pedal 3 operated by the driver. Instead, throttle actuator 4 is arranged to control the opening (degree) of throttle valve 5 electronically.

An engine controller 14 produces a signal representing a target throttle opening (tTVO) in accordance with a command engine torque cTE as explained later. In response to the target throttle opening (tTVO), throttle actuator 4 varies the throttle opening of throttle valve 5 so as to make the actual throttle opening equal to the target throttle opening. Thus, engine controller 14 can control the output of engine 1 basically in accordance with the driver's accelerator input. Moreover, command engine torque cTE can be determined so as to control the engine output in accordance with a factor or factors other than the driver's input on accelerator pedal.

Transmission 2 of this example is a V-belt continuously-variable transmission (CVT) including a primary pulley 7 drivingly connected through a torque converter 6 with the output shaft of engine 1, a secondary pulley 8, and a V belt 9 connecting primary and secondary pulleys 7 and 8. Secondary pulley 8 is drivingly connected through a final drive gear set 10 to a differential gear unit 11 for driving wheels of the vehicle.

In order to vary the speed ratio, each pulley 7 or 8 is arranged to increase and decrease the groove width of a V groove formed between a movable flange and a fixed flange. A shift control hydraulic circuit 12 produces a primary pulley fluid pressure Ppri and a secondary pulley fluid pressure Psec, and thereby determines the stroke positions of the movable flanges of primary and secondary pulleys 7 and 8 to determine the speed ratio or transmission ratio.

A transmission actuator (or shift actuator) 13 of this example is a step (or stepper) motor. A transmission controller 15 drives step motor 13 to a step position STP corresponding to a command transmission (gear) ratio (cRATIO) as explained later, and thereby controls the actual transmission (gear) ratio of continuously-variable transmission 2 continuously so as to make the actual transmission ratio equal to command transmission ratio (cRATIO).

A driving force controller 16 determines command engine torque cTE for engine controller 14, and command transmission ratio cRATIO for transmission controller 15, according to a calculation process as explained below, by using input information on vehicle operating conditions supplied from the following input devices.

An accelerator opening (or position) sensor 17 senses the position of an accelerator pedal 3 (known as accelerator pedal depression quantity or degree, or accelerator opening degree) APO. An engine speed sensor 18 senses an engine speed (or rpm) aNE. In this example, engine speed sensor 18 senses engine speed aNE from an ignition signal of engine 1. A vehicle speed sensor 19 senses a vehicle speed aVSP from the rotational speed of a wheel or wheels of the vehicle. A brake switch 20 turns on to signal a braking operation when a brake pedal is depressed. A driving force control switch 21 is a switch which the driver can turn on when the driver desires the driving force control according to this embodiment. The signals from these sensors and switches are supplied to driving force controller 16.

Figure 2:
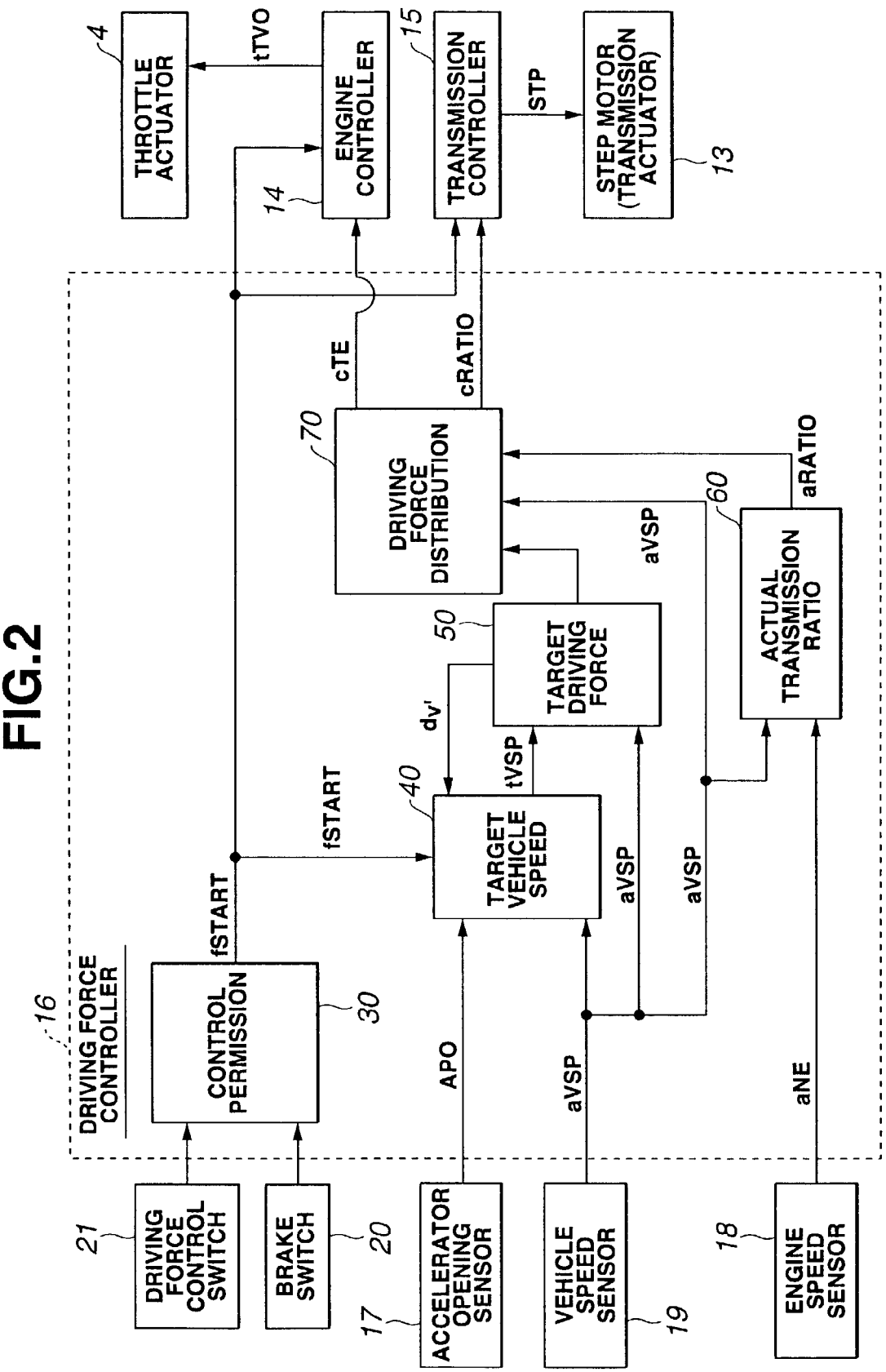
FIG. 2 is a block diagrams showing an arrangement of functional blocks in a driving force controller shown in FIG. 1 for transmission control for a continuously-variable transmission and engine throttle control.

Driving force controller 16 reads the input information at regular time intervals of a control cycle by timer interrupt, and performs operations shown in FIG. 2 in the form of functional blocks, to calculate command engine torque cTE for engine controller 14 and command transmission ratio cRATIO for transmission controller 15. In response to these command signals cTE and cRATIO, engine controller 14 and transmission controller 15 control the throttle opening of engine 1 and transmission ratio of continuously-variable transmission 2, respectively, and thereby control the driving force of the vehicle as intended in this embodiment of the invention.

As shown in FIG. 2, driving force controller 16 includes a driving force control permitting section 30, a target vehicle speed setting section 40, a target driving force calculating section 50, an actual transmission ratio calculating section 60 and a driving force distributing section 70.

Figure 3:
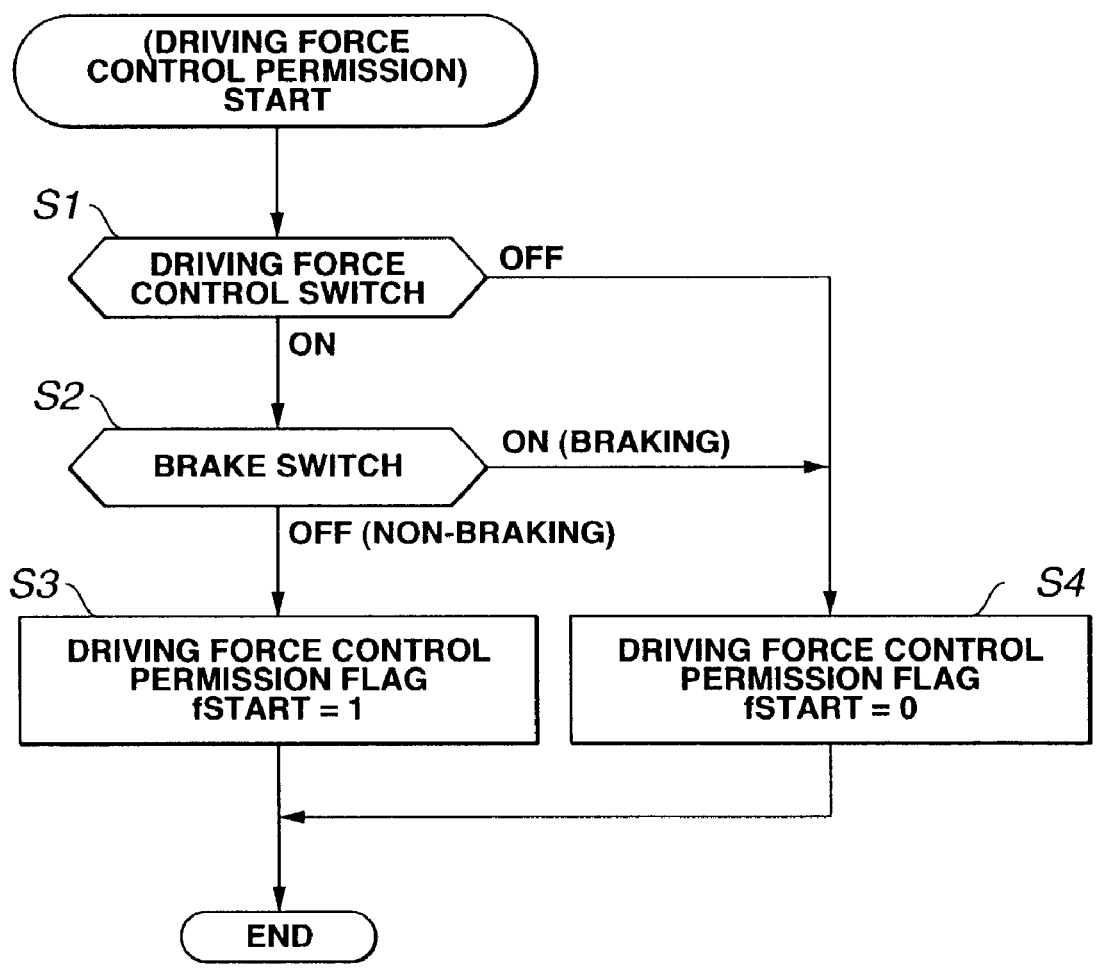
FIG. 3 is a flowchart showing a control program performed by a driving force control permitting section shown in FIG. 2, to determine whether to perform the driving force control.

Driving force control permitting section 30 performs a control program shown in FIG. 3, and thereby determines whether to perform the driving force control. In dependence on the result, permitting section 30 sets a driving force control permission flag fSTART to one or zero.

Step S1 in FIG. 3 checks whether driving force control switch 21 is ON or OFF. Next step S2 checks whether brake switch 20 is ON or OFF. When driving force control switch 21 is ON (indicating that the driver desires the driving force control) and at the same time brake switch is OFF (the brake is out of operation), then permitting section 30 proceeds from step S2 to step S3, and sets driving force control permission flag fSTART to one to permit a start of the driving force control on the assumption that the driver's intention is confirmed and the brake is in the inoperative state allowing the driving force control.

If, however, driving force control switch 21 is OFF (when the driver does not desire the driving force control) or brake switch 20 is ON (the brake system in the operative state), then permitting section 30 proceeds from step S1 or S2, to step S4, and resets driving force control permission flag fSTART to zero on the assumption that the driver's intension is against the driving force control or the brake system is in the operative state to brake the vehicle in which it is difficult to perform the driving force control properly. During a brake operation during which brake switch 20 is ON, the driving force control system cannot achieve the intended purpose of the vehicle speed control even with the engine output control and transmission control.

It is optional to omit the driving force control switch 21. In this case, the driving force control is performed without regard to the intention of the driver. In this case, permitting section 30 sets or resets driving force control permission flag fSTART in dependence only on the ON/OFF condition of brake switch 20.

Driving force control permission flag fSTART is supplied to target vehicle speed setting section 40, and further supplied to engine controller 14 and transmission controller 15 as shown in FIGS. 1 and 2. When driving force control permission flag fSTART is set to one, engine controller 14 and transmission controller 15 determine the target throttle opening tTVO for throttle actuator 4 and command step position STP for transmission actuator 13 in accordance with command engine torque cTE and command transmission ratio cRATIO, and control the throttle actuator 4 and transmission actuator 13 to achieve the commands from driving force controller 16. When, on the other hand, driving force control permission flag fSTART is equal to zero, this control system controls the throttle opening of engine 1 and the transmission ratio of continuously-variable transmission 2 in normal modes, instead of the driving force control according to this embodiment.

Figure 4:
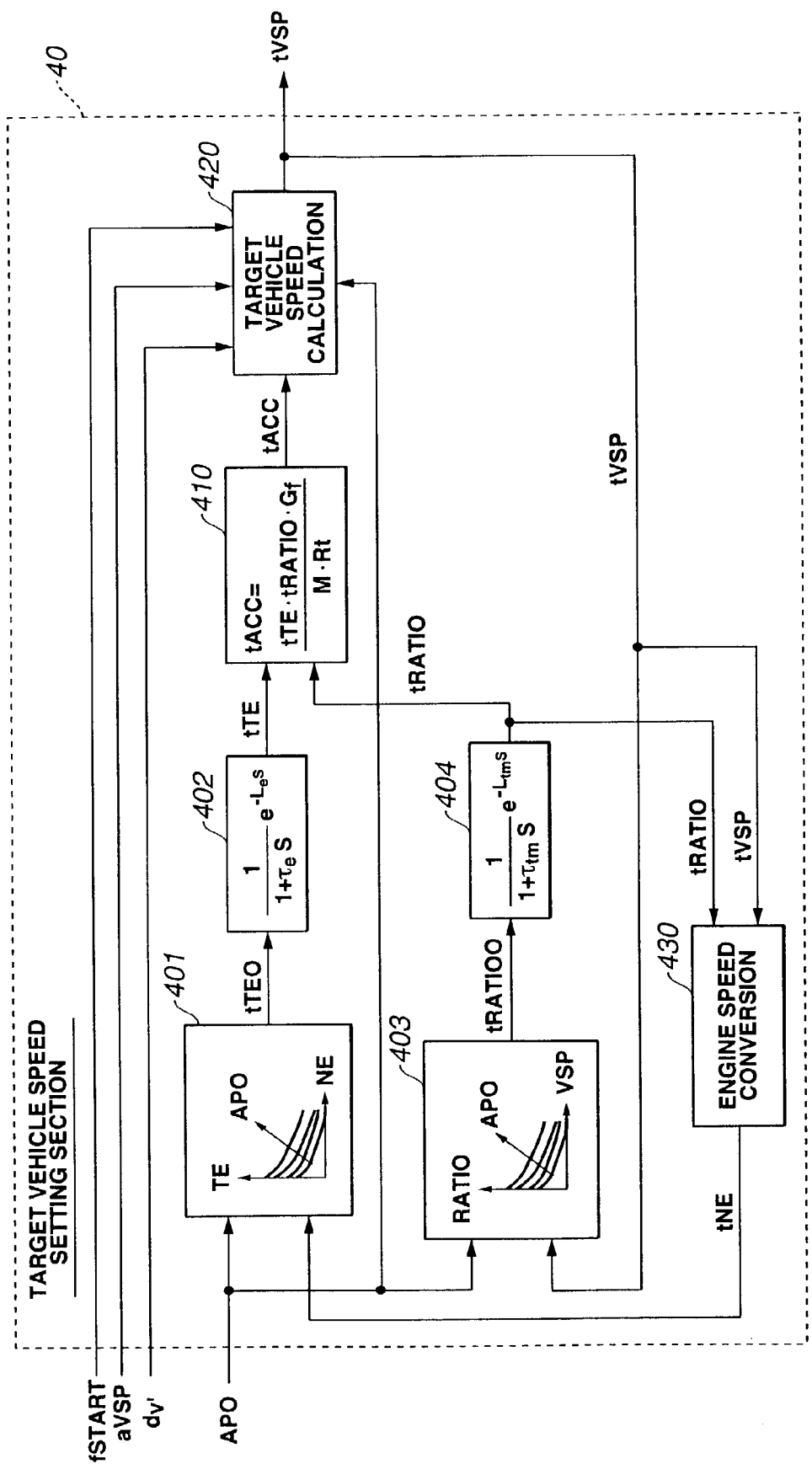
FIG. 4 is a functional block diagram showing a target vehicle speed setting section shown in FIG. 2.

Target vehicle speed setting section 40 of FIG. 2 is shown more in detail in FIG. 4. Target vehicle speed setting section 40 includes a target engine torque setting section 401, an engine model 402, a target transmission ratio setting section 403, a transmission model 404, a target acceleration determining section 410, a target vehicle speed calculating section 420 and an engine speed converting section 430.

Target engine torque setting section 401 and engine model 402 determine target engine torque tTE in accordance with accelerator depression quantity APO and target engine speed tNE. Target transmission ratio setting section 403 and transmission model 404 determine target transmission ratio tRATIO in accordance with accelerator pedal depression quantity APO and target vehicle speed tVSP. Target acceleration determining section 410 calculates target acceleration tACC in accordance with target engine torque tTE and target transmission ratio tRATIO. Target vehicle speed calculating section 420 calculates target vehicle speed tVSP to achieve target acceleration tACC. Engine speed converting section 430 calculates target engine speed tNE in accordance with target transmission ratio tRATIO and target vehicle speed tVSP.

Figure 5:
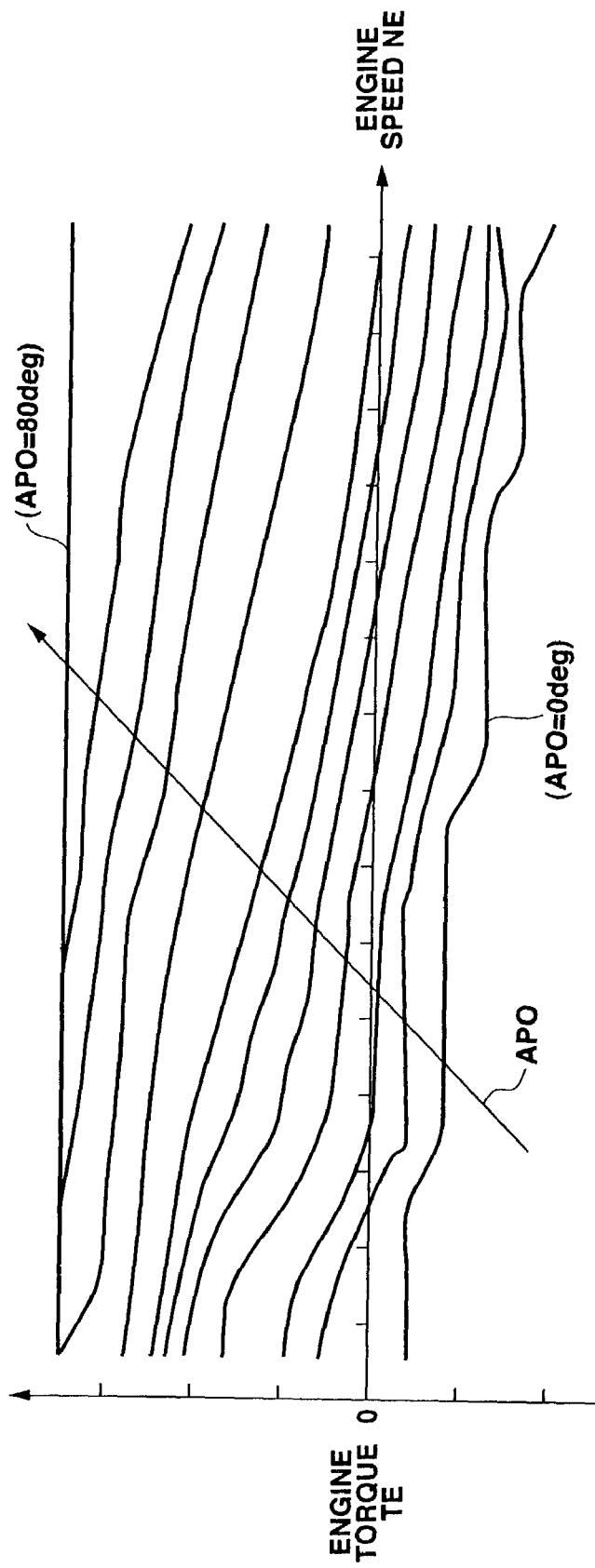
FIG. 5 is a graph showing a characteristic of engine torque which a target engine torque setting section in the target vehicle speed setting section shown in FIG. 4 uses for determining a target engine torque.

Target engine torque setting section 401 sets a before-filter target engine torque tTE0 from accelerator depression quantity APO and target engine speed tNE, by lookup from a map representing a relation between engine speed and engine torque with acceleration depression quantity APO as a parameter, as shown in FIG. 5. Engine model 402 is a filter for compensating for a delay in engine 1 with a mathematical model of engine 1. In this example, engine model 402 is defined as:

$$Ge(s) = \frac{1}{1 + \tau_e s} e^{-L_e s} \qquad \text{MATH 1}$$

In this equation $\tau e$ is a time constant, and Le is a dead time. This system determines the target engine torque tTE by passing the before-filter target engine torque tTE0 through this engine model 402. In this way, engine model 402 can provide target engine torque tTE more suitable to the actual vehicle with the compensation for delay, and facilitates setting of various parameters.

Figure 6:
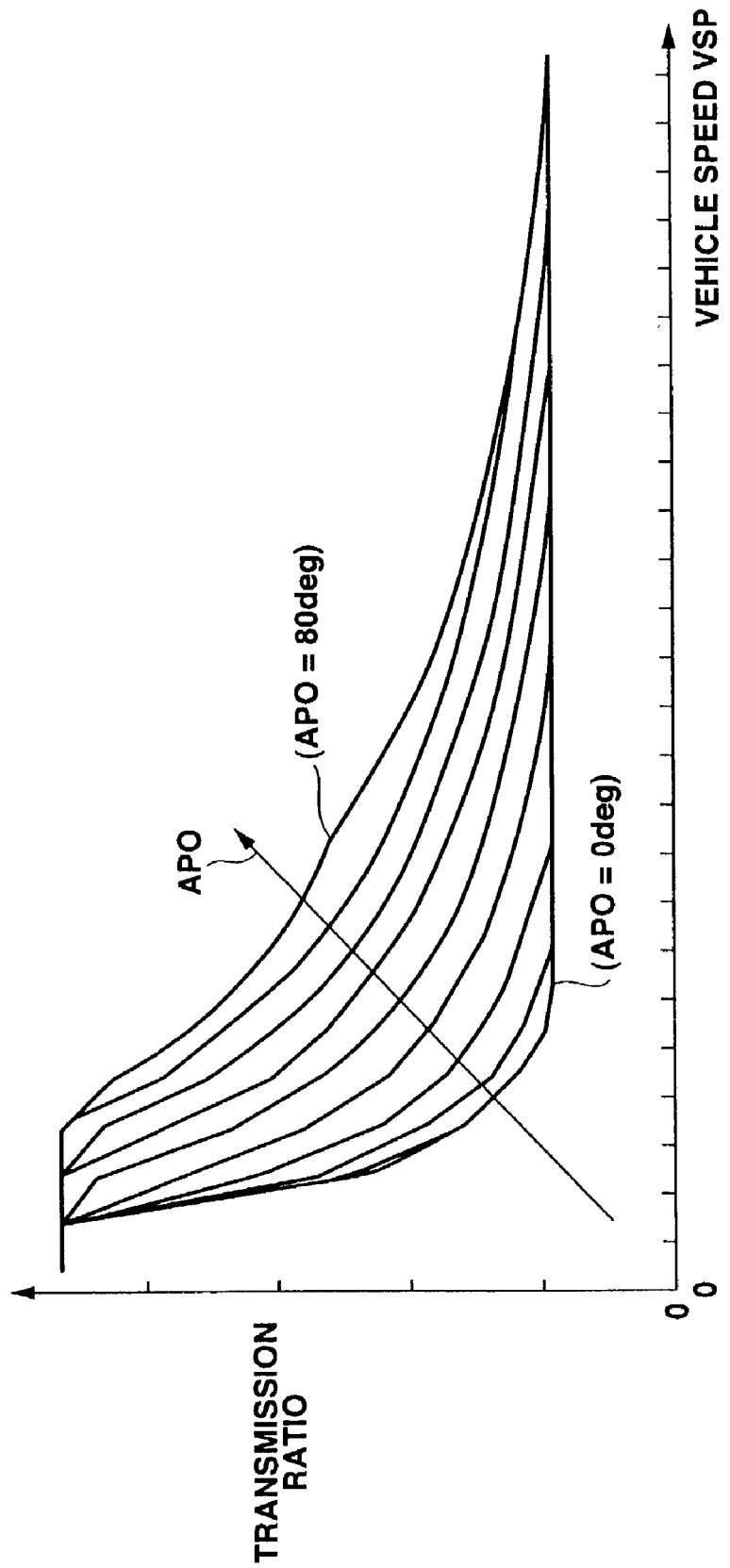
FIG. 6 is a graph showing a characteristic of transmission ratio which a target transmission ratio setting section in the target vehicle speed setting section of FIG. 4 uses for determining a target transmission ratio.

Target transmission ratio setting section 403 sets a before-filter target transmission ratio tRATIO0 from accelerator depression quantity APO and target vehicle speed tVSP, by lookup from a map representing a relation between vehicle speed and transmission ratio with acceleration depression quantity APO as a parameter, as shown in FIG. 6. Transmission model 404 is a filter for compensating for a delay in transmission 2 with a mathematical model of continuously-variable transmission 2 (shown in FIG. 1). In this example, transmission model 404 is defined as:

$$Gtm(s) = \frac{1}{1 + \tau_{tm} s} e^{-L_{tm} s} \qquad \text{MATH 2}$$

In this equation $\tau tm$ is a time constant, and Ltm is a dead time. This system determines the target transmission ratio tRATIO by passing the before-filter target transmission ratio tRATIO0 through this transmission model 404. In this way, transmission model 404 can provide target transmission ratio tRATIO more suitable to the actual vehicle with the compensation for delay, and facilitates setting of various parameters.

Target acceleration determining section 410 shown in FIG. 4 calculates target vehicle acceleration tACC in accordance with target engine torque tTE and target transmission ratio tRATIO, by using the following equation.

$$tACC = \frac{tTE \cdot tRATIO \cdot Gf}{M \cdot Rt} \qquad \text{MATH 3}$$

In this equation, M is a vehicle mass, Rt is a dynamic tire radius, and Gf is a final gear ratio.

Target vehicle speed calculating section 420 shown in FIG. 4 receives driving force control permission flag fSTART from control permitting section 30 of FIG. 2, an estimated disturbance (quantity) dv' (generally representing a road gradient) from target driving force calculating section 50 shown in FIG. 2, actual vehicle speed aVSP, and actual accelerator pedal depression quantity APO, and calculates target vehicle speed tVSP from these inputs according to a process explained below.

Figure 7:
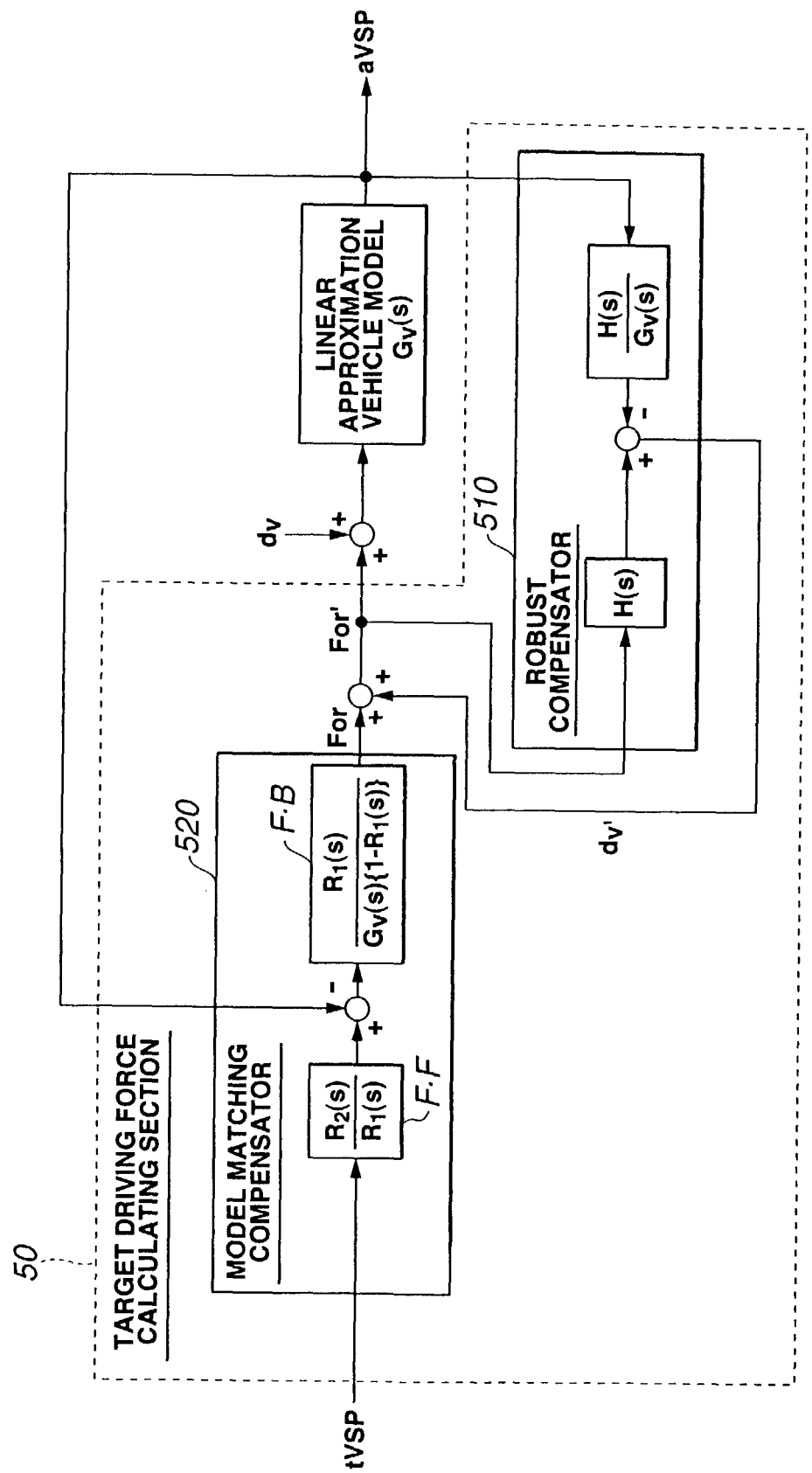
FIG. 7 is a functional block diagram showing a target driving force calculating section shown in FIG. 2.

Target driving force calculating section 50 according to this embodiment is arranged to determine the estimated disturbance (quantity) dv' to be supplied to target vehicle speed calculating section 420 in target vehicle speed setting section 40, as shown in FIG. 2. As shown in FIG. 7, target driving force calculating section 50 of this example is composed of a robust compensator 510 and a model matching compensator 520, on the basis of so-called robust model matching control technique, to build a control system which is not readily affected by disturbance such as changes in road gradient. Robust compensator 510 is a disturbance estimator, and model matching compensator 520 is for making the response characteristic of the entire system equal to the response characteristic of a reference model.

Robust compensator 510 performs estimation and correction about modeling errors of the controlled system and disturbance in the form of running resistance, and thereby forms the control system to match the actual characteristic to a linear model {Gv(s)}. H(s) in robust compensator 510 is a robust filter determining disturbance removing performance. In this example, $$Hs = \frac{1}{\tau_C \cdot s + 1} \qquad \text{MATH 4}$$

In this equation, $\tau c$ is a first order lag time constant.

The estimated disturbance dv' determined in robust compensator 510 by approximate zeroing technique is considered to be a variable mainly representing the road gradient or grade. Target vehicle speed calculating section 420 shown in FIG. 4 receives this estimated disturbance dv', and modifies the target acceleration in accordance with the road gradient or grade.

Model matching compensator 520 shown in FIG. 7 includes a feedforward (F/F) section determining the response characteristic of input and output with a reference model R2(s), and a feedback (F/B) section determining the disturbance removing ability and system stability with a reference model R1(s). In this example, each of these reference models is in the form of a low-pass filter of first order lag expressed as:

$$R_1(s) = \frac{1}{T_1 \cdot s + 1} \qquad \text{MATH 5}$$

where T1 is a first order lag time constant.

$$R_2(s) = \frac{1}{T_2 \cdot s + 1} \qquad \text{MATH 6}$$

where T2 is a first order lag time constant.

The linear approximation model Gv(s) of the vehicle to be controlled is a model of integral characteristic expressed as:

$$G_v(s) = \frac{1}{M_v \cdot s} \qquad \text{MATH 7}$$

where Mv is vehicle mass.

Thus, command driving force For and target driving force For' corresponding to target vehicle speed tVSP, and estimated disturbance dv' are obtained by the following equations.

$$F_{or}(s) = \frac{R_1(s)}{G_v(s)(1 - R_1(s))} \left( \frac{R_2(s)}{R_1(s)} tVSP - aVSP \right) = \qquad \text{MATH 8}$$

$$\frac{M_v}{T_1} \left( \frac{1 + T_1 \cdot s}{1 + T_2 \cdot s} tVSP - aVSP \right)$$

$$F'_{or}(s) = \qquad \text{MATH 9}$$

$$\frac{1}{1 - H(s)} \left( F_{or}(s) - \frac{H(s)}{G_v(s)} aVSP \right) = \frac{1 + \tau_c \cdot s}{\tau_c \cdot s} F_{or}(s) - \frac{M_v}{\tau_c} aVSP$$

$$d'_v = F'_{or} H(s) - aVSP \frac{H(s)}{G_v(s)} = \frac{1}{\tau_c \cdot s + 1} (F'_{or} - M_v \cdot s) \qquad \text{MATH 10}$$

Actual transmission ratio calculating section 60 (shown in FIG. 2) calculates actual transmission ratio aRATIO from actual vehicle speed aVSP, and actual engine speed aNE sensed by engine speed sensor 18, by using the following equation.

$$aRATIO = \frac{aNE \cdot 2\pi R_t}{aVSP \cdot Gf} \qquad \text{MATH 11}$$

In this equation, Gf is final gear ratio, and Rt is dynamic tire radius. The calculated actual transmission ratio aRATIO is supplied to driving force distributing section 70 (shown in FIG. 2).

Figure 8:
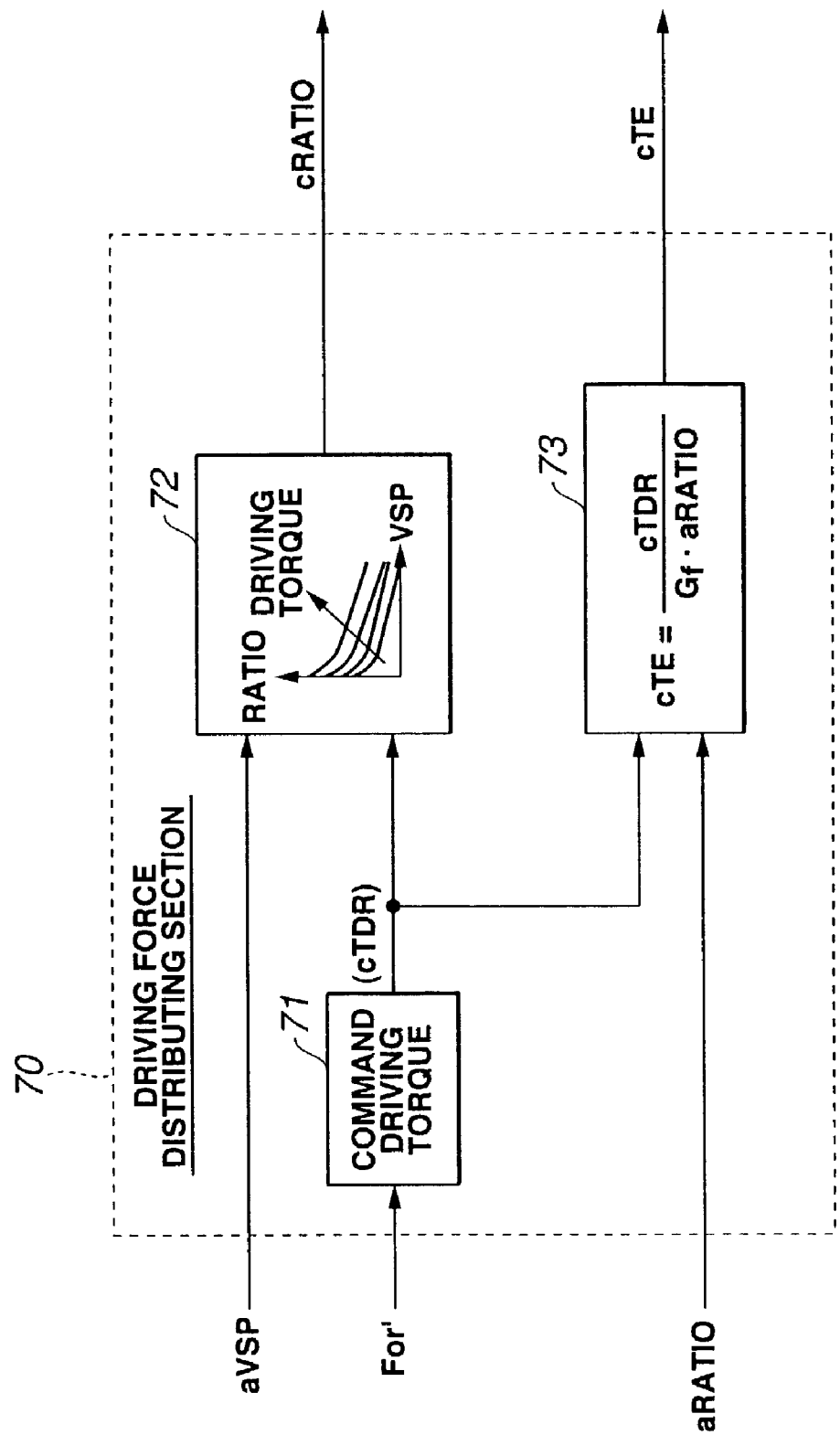
FIG. 8 is a functional block diagram showing a driving force distributing section shown in FIG. 2.

FIG. 8 shows driving force distributing section 70 (shown in FIG. 2). Driving force distributing section 70 includes a command drive torque calculating section 71, a command transmission ratio calculating section 72 and a command engine torque calculating section 73. Driving force distributing section 70 receives actual vehicle speed aVSP, target driving force For' and actual transmission ratio aRATIO, and determines, from these inputs, a command transmission ratio cRATIO and a command engine torque cTE. Command drive torque calculating section 71 calculates command drive torque cTDR from target driving force For' by the following equation.

$$cTDR = For' \times Rt \qquad \text{MATH 12}$$

where Rt is dynamic tire radius.

Figure 9:
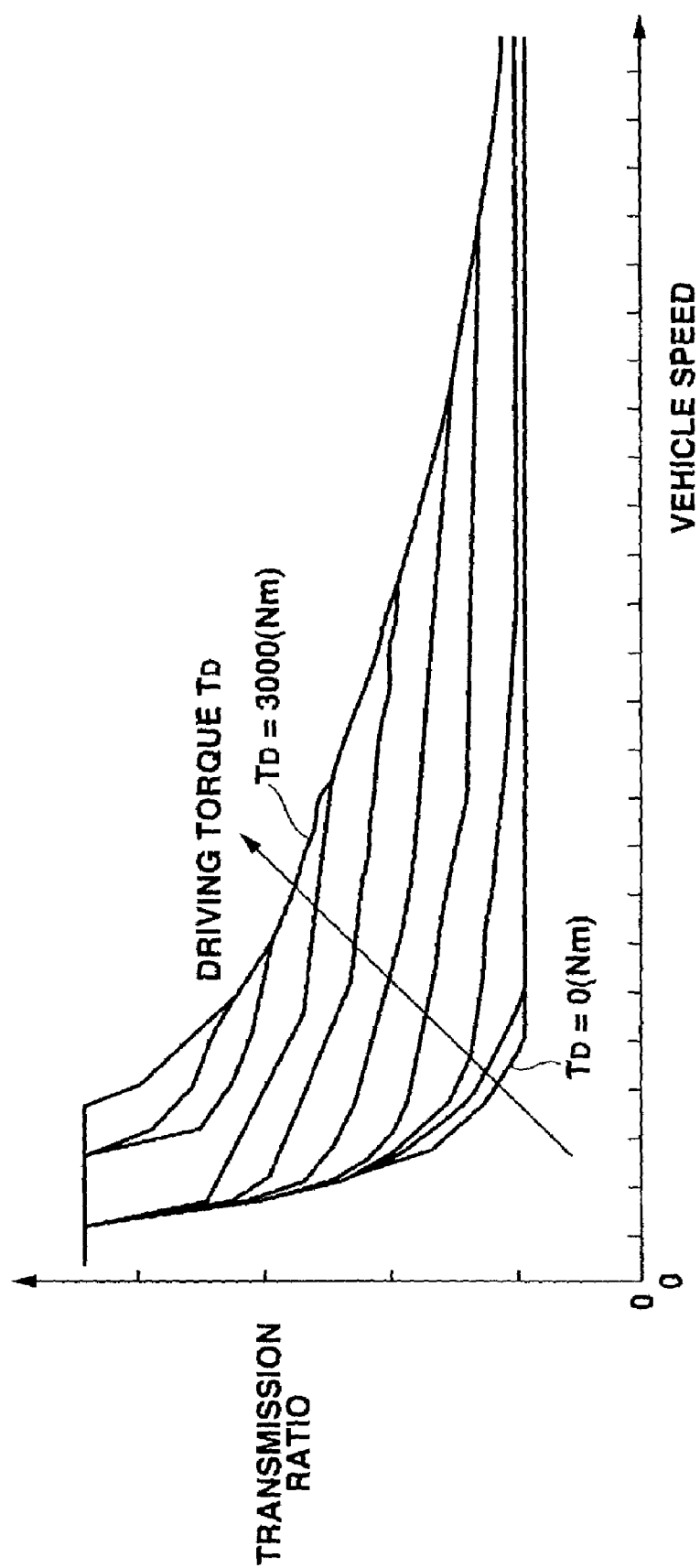
FIG. 9 is a graph showing a characteristic of a transmission ratio used by a command transmission ratio setting section in the driving force distributing section of FIG. 8, for determining a command transmission ratio.

Command transmission ratio setting section 72 determines command transmission ratio cRATIO in accordance with actual vehicle speed aVSP of the controlled vehicle, and command driving torque cTDR by using a map representing a relation of the transmission ratio with respect to the vehicle speed with driving torque as a parameter as shown in FIG. 9. As shown in FIG. 9, command transmission ratio cRATIO increases as command driving torque cTDR increases. Command transmission ratio cRATIO decreases as the vehicle speed increases if command driving torque cTDR remains unchanged. In FIG. 9, TD stands for driving torque.

Command engine torque calculating section 73 calculates command engine torque cTE from command driving torque cTDR and actual transmission ratio aRATIO, by using the following equation.

$$cTE = \frac{cTDR}{Gf \cdot aRATIO} \qquad \text{MATH 13}$$

In this equation, Gf is final gear ratio.

The thus-obtained command engine torque cTE is inputted to engine controller 14 (shown in FIG. 2), which determines target throttle opening tTVO corresponding to command engine torque cTE and delivers the target throttle opening tTVO to throttle actuator 4. On the other hand, command transmission ratio cRATIO is inputted to transmission controller 15 (FIG. 2). Transmission controller 15 determines command step position STP corresponding to command transmission ratio cRATIO and delivers the command step position STP to transmission actuator 13. In this way, this control system can achieve the target driving force For'.

Figure 10:
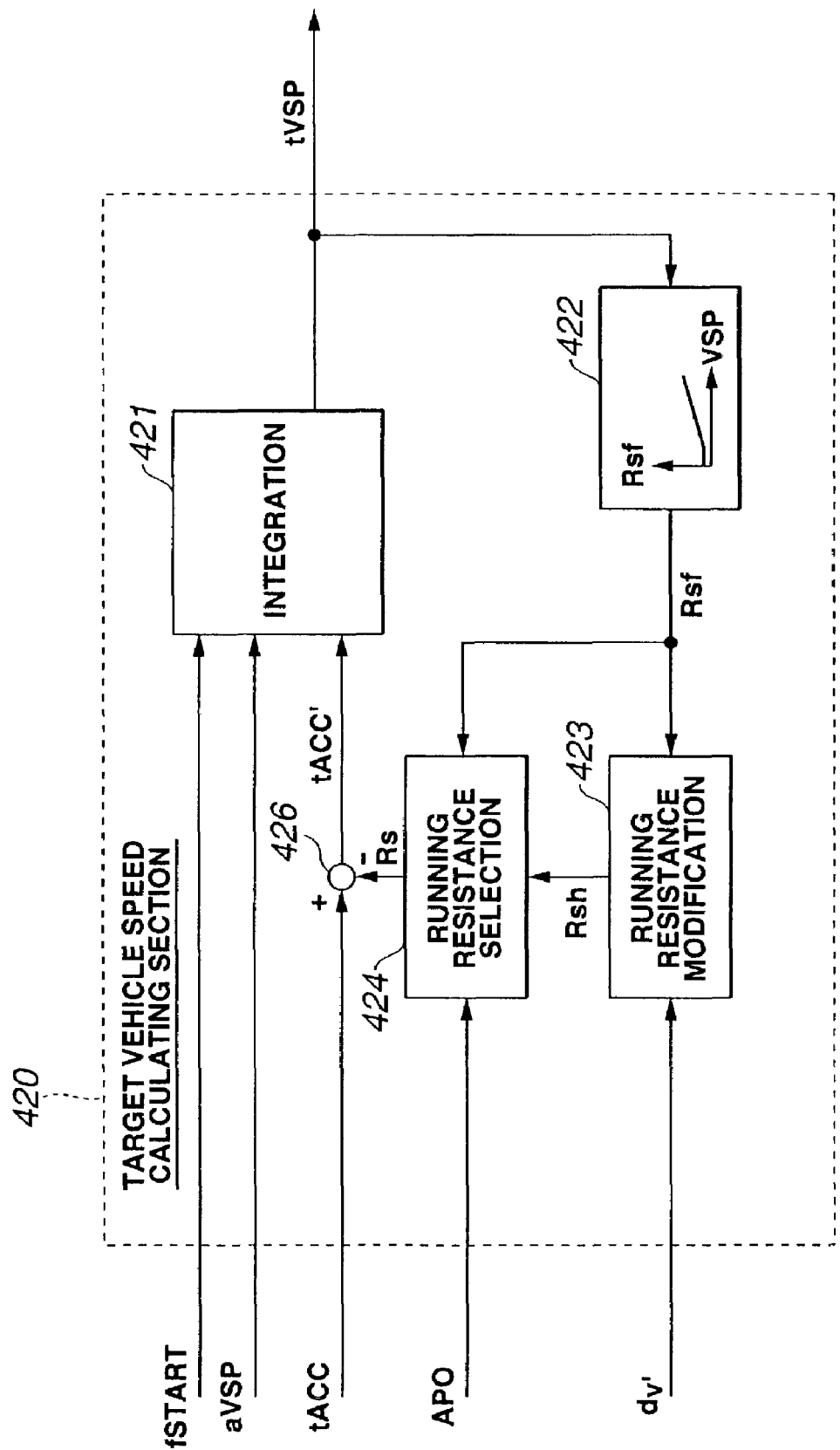
FIG. 10 is a functional block diagram showing a target vehicle speed calculating section shown in FIG. 4.

FIG. 10 shows target vehicle speed calculating section 420 of FIG. 4. As shown in FIG. 10, target vehicle speed calculating section 420 includes an integrating section 421, a flat road running resistance setting section 422, a running resistance modifying section 423 and a running resistance selecting section 424.

Integrating section 421 receives the before-mentioned driving force control permission flag fSTART, actual vehicle speed aVSP, and a modified target acceleration tACC' obtained by modifying target acceleration tACC of target acceleration calculating section 410, with the road gradient, and calculates target vehicle speed tVSP from these inputs.

Figure 11:
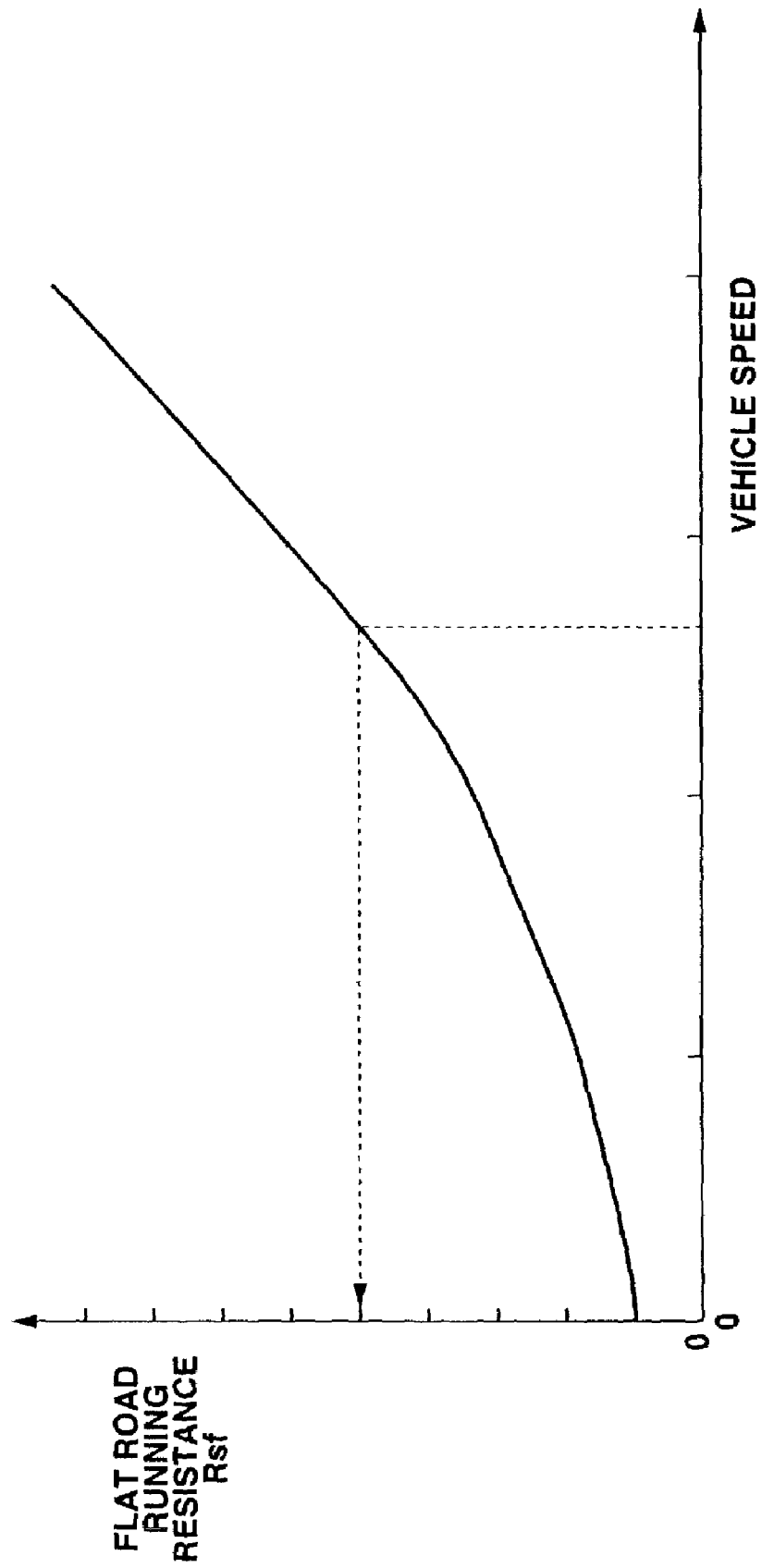
FIG. 11 is a graph showing a characteristic of a flat road running resistance used by a flat road running resistance setting section in the target vehicle speed calculating section shown in FIG. 10.

Modified target acceleration tACC' is determined by modifying target acceleration tACC with the road gradient in the following manner. Flat road running resistance setting section 422 calculates a flat road running resistance Rsf from target vehicle speed tVSP by using a predetermined map representing a relation between vehicle speed and running resistance on a flat road as shown in FIG. 11. Running resistance modifying section 423 calculates modified running resistance Rsh in accordance with estimated disturbance dv' (mainly representing the road gradient) determined in target driving force calculating section 50 shown in FIG. 7, and flat road running resistance Rsf.

Figure 12:
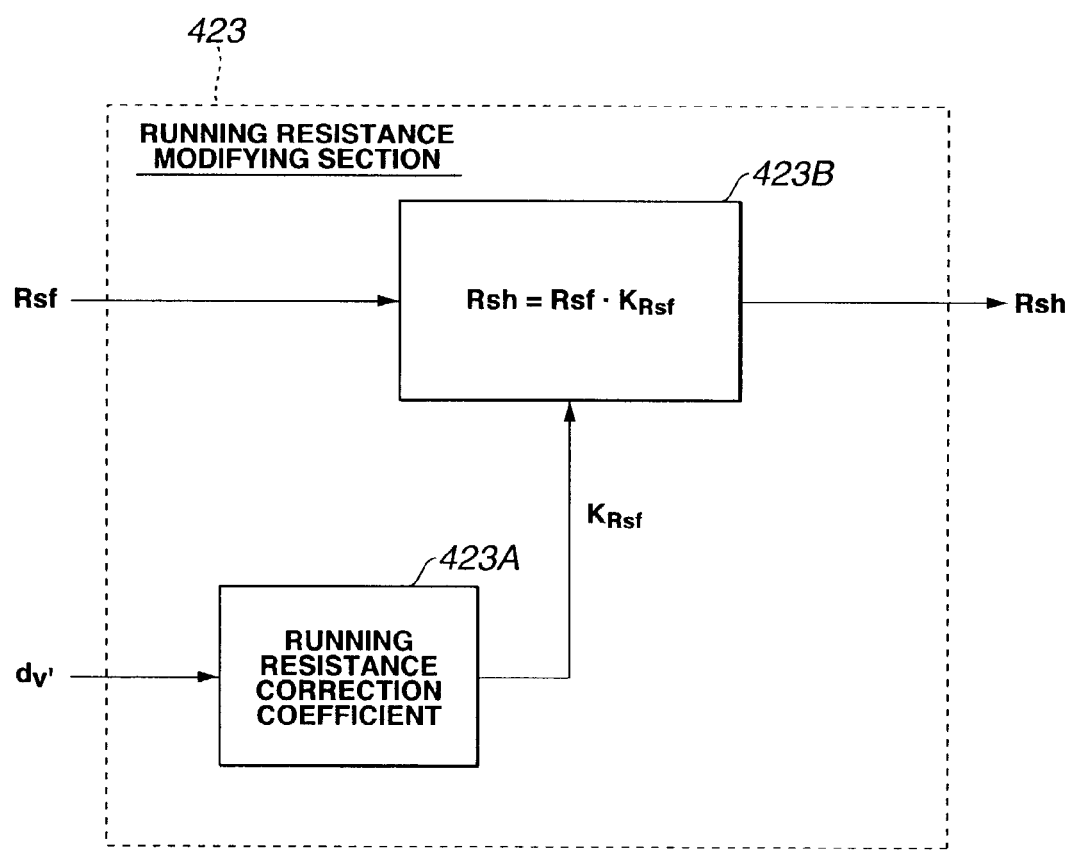
FIG. 12 is a functional block diagram showing a first example of a running resistance modifying section shown in FIG. 10.
Figure 13:
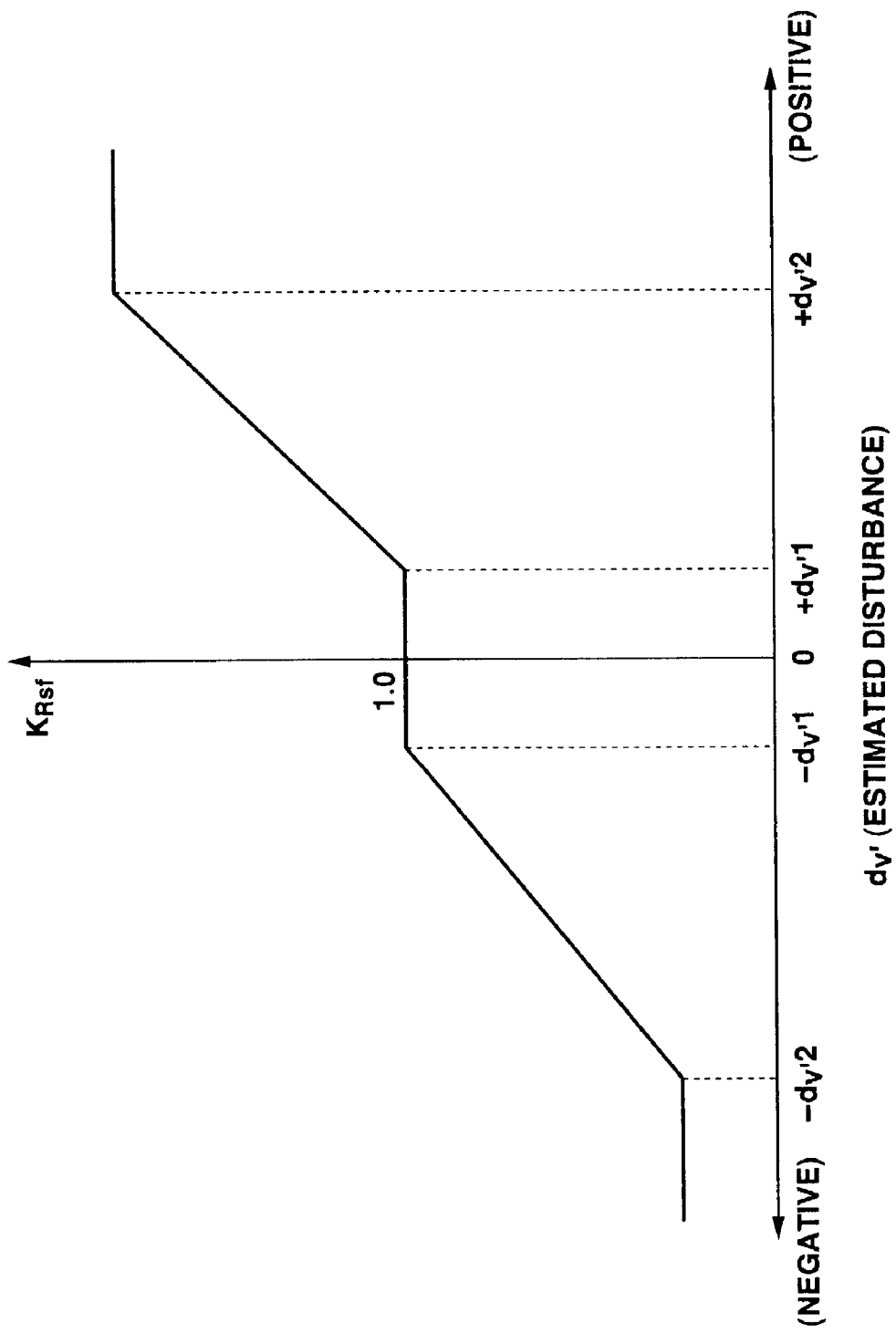
FIG. 13 is a graph showing a characteristic of a running resistance correction coefficient used by the running resistance modifying section of FIG. 12.
Figure 14:
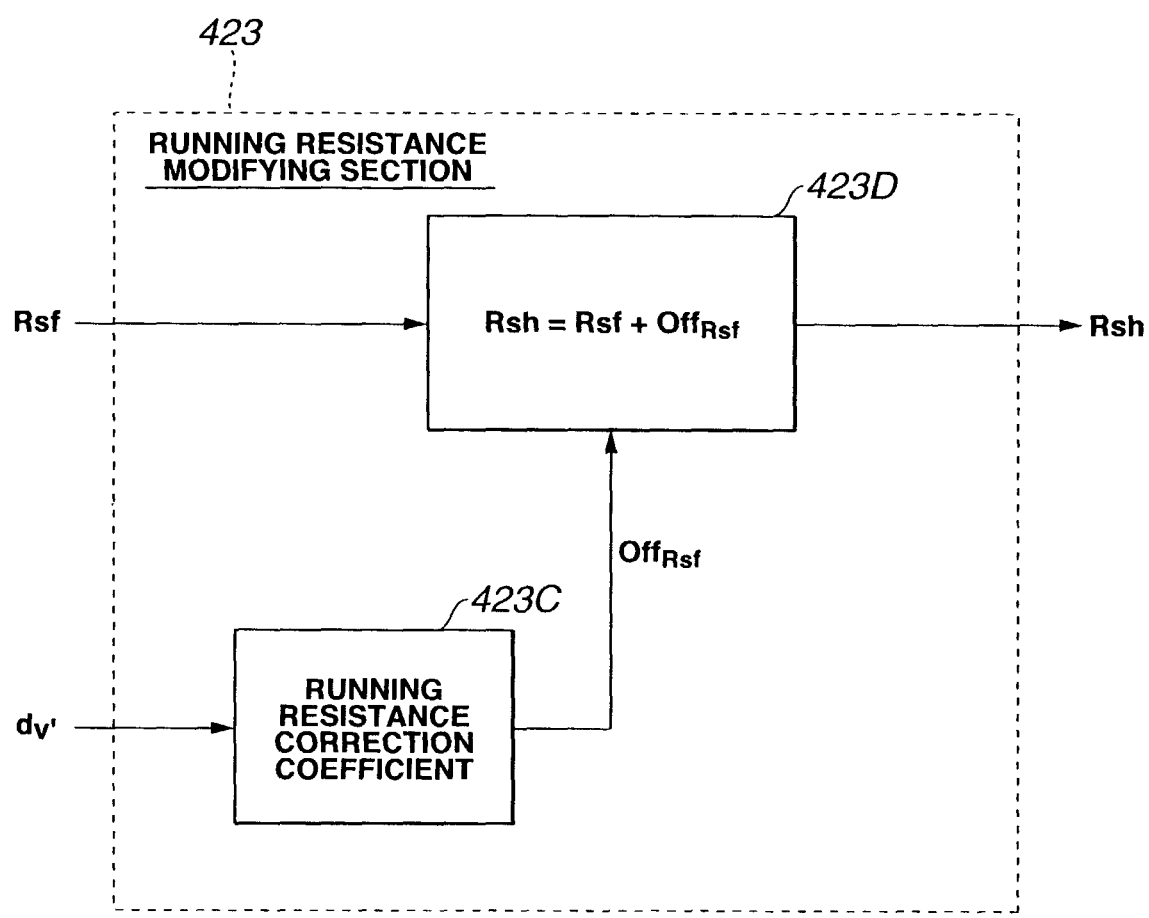
FIG. 14 is a functional block diagram showing a second example of the running resistance modifying section shown in FIG. 10.
Figure 15:
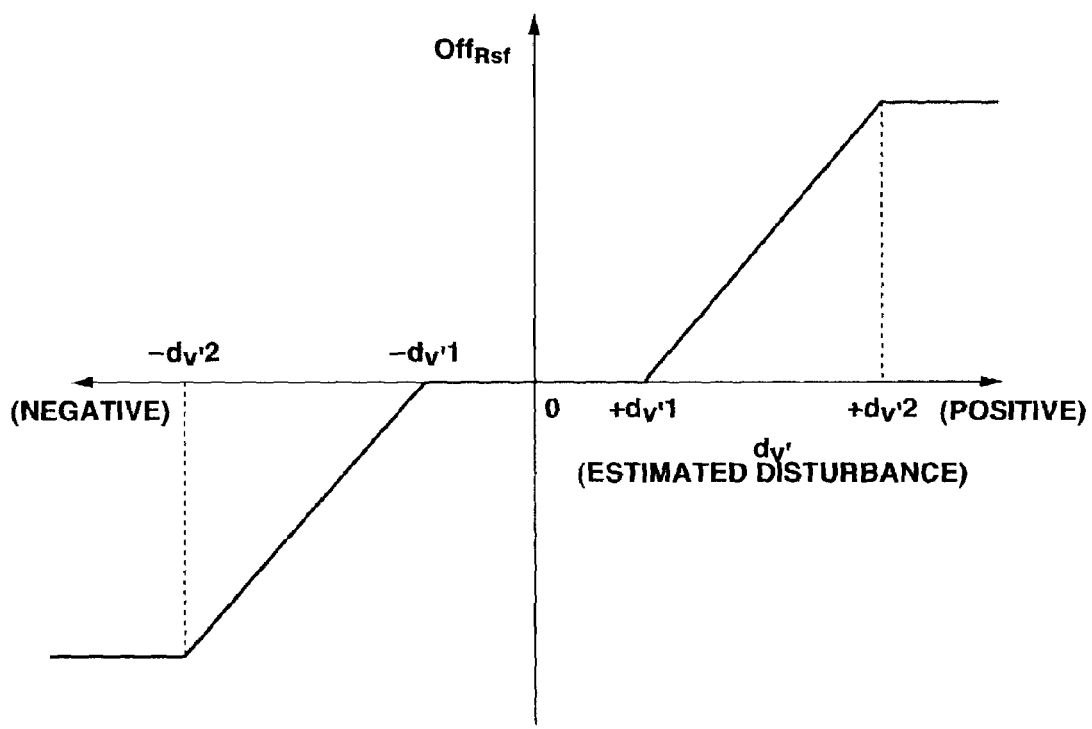
FIG. 15 is a graph showing a characteristic of a running resistance correction quantity used by the running resistance modifying section of FIG. 14.

Running resistance modifying section 423 calculates modified running resistance Rsh in a method shown in FIGS. 12 and 13, or in a method shown in FIGS. 14 and 15.

In the calculating method of FIGS. 12 and 13, running resistance modifying section 423 includes a running resistance correction coefficient determining section 423A and a modified running resistance calculating section 423B. Running resistance correction coefficient determining section 423A determines a running resistance correction coefficient KRsf from estimated disturbance dv' (indicative of the road gradient), by lookup from a data map shown in FIG. 13. Running resistance correction coefficient KRsf is determined in advance as a correction coefficient for determining modified running resistance Rsh adapted to the road gradient, from flat road running resistance Rsf, as shown in FIG. 13. In this example, running resistance correction coefficient KRsf is determined experimentally so as to obtain target vehicle speed tVSP to achieve optimum coasting deceleration suitable to estimated disturbance dv' (road gradient). As shown in FIG. 13, running resistance correction coefficient KRSf in this example is fixed equal to an upper limit value greater than one when estimated disturbance dv' (road gradient) is greater than a predetermined value +dv'2, and fixed equal to a lower limit value smaller than one when estimated disturbance dv' (road gradient) is smaller than a predetermined value −dv'2. Correction coefficient KRsf is fixed equal to one when estimated disturbance dv' is between +dv'1 and −dv'1. Correction coefficient KRsf is increased linearly with increase in dv' between −dv'2 and −dv'1, and between dv'1 and dv'2.

Then, modified running resistance calculating section 423B shown in FIG. 12 determines modified running resistance Rsh corresponding to the road gradient by multiplication of flat road running resistance Rsf and correction coefficient KRSf.

$$Rsh = Rsf \cdot KRsf \qquad \text{MATH 14}$$

In the example of FIG. 13, correction coefficient KRSf is held equal to 1.0 when estimated disturbance dv' is in a small region between +dv'1 and −dv'1. In this region, therefore, the modification of the running resistance is not carried out in effect, and the modified running resistance Rsh is set equal to flat road running resistance Rsf.

In the calculating method of FIGS. 14 and 15, on the other hand, running resistance modifying section 423 includes a running resistance correction quantity determining section 423C and a modified running resistance calculating section 423D. Running resistance correction quantity determining section 423C determines a running resistance correction quantity OffRsf from estimated disturbance dv' (indicative of the road gradient), by lookup from a data map shown in FIG. 15. Running resistance correction quantity OffRsf is determined in advance as a correction quantity for determining modified running resistance Rsh adapted to the road gradient, from flat road running resistance Rsf, as shown in FIG. 15. In this example, running resistance correction quantity OffRsf is determined experimentally so as to obtain target vehicle speed tVSP to achieve optimum coasting deceleration suitable to estimated disturbance dv' (road gradient). As shown in FIG. 15, running resistance correction quantity OffRsf in this example is fixed equal to an upper limit value greater than zero when estimated disturbance dv' (road gradient) is greater than a predetermined value +dv'2, and fixed equal to a lower limit value smaller than zero when estimated disturbance dv' (road gradient) is smaller than a predetermined value −dv'2. Correction quantity OffRsf is fixed equal to zero when estimated disturbance dv' is between +dv'1 and −dv'1. Correction quantity OffRsf is increased linearly with increase in dv' between −dv'2 and −dv'1, and between dv'1 and dv'2.

Then, modified running resistance calculating section 423D shown in FIG. 14 determines modified running resistance Rsh corresponding to the road gradient by addition of flat road running resistance Rsf and correction quantity OffRsf.

$$Rsh = Rsf + OffRsf \qquad \text{MATH 15}$$

In the example of FIG. 15, correction quantity OffRsf is held equal to zero when estimated disturbance dv' is in the small region between +dv'1 and −dv'1. In this region, therefore, the modification of the running resistance is not carried out in effect, and the modified running resistance Rsh is set equal to flat road running resistance Rsf.

Figure 16:
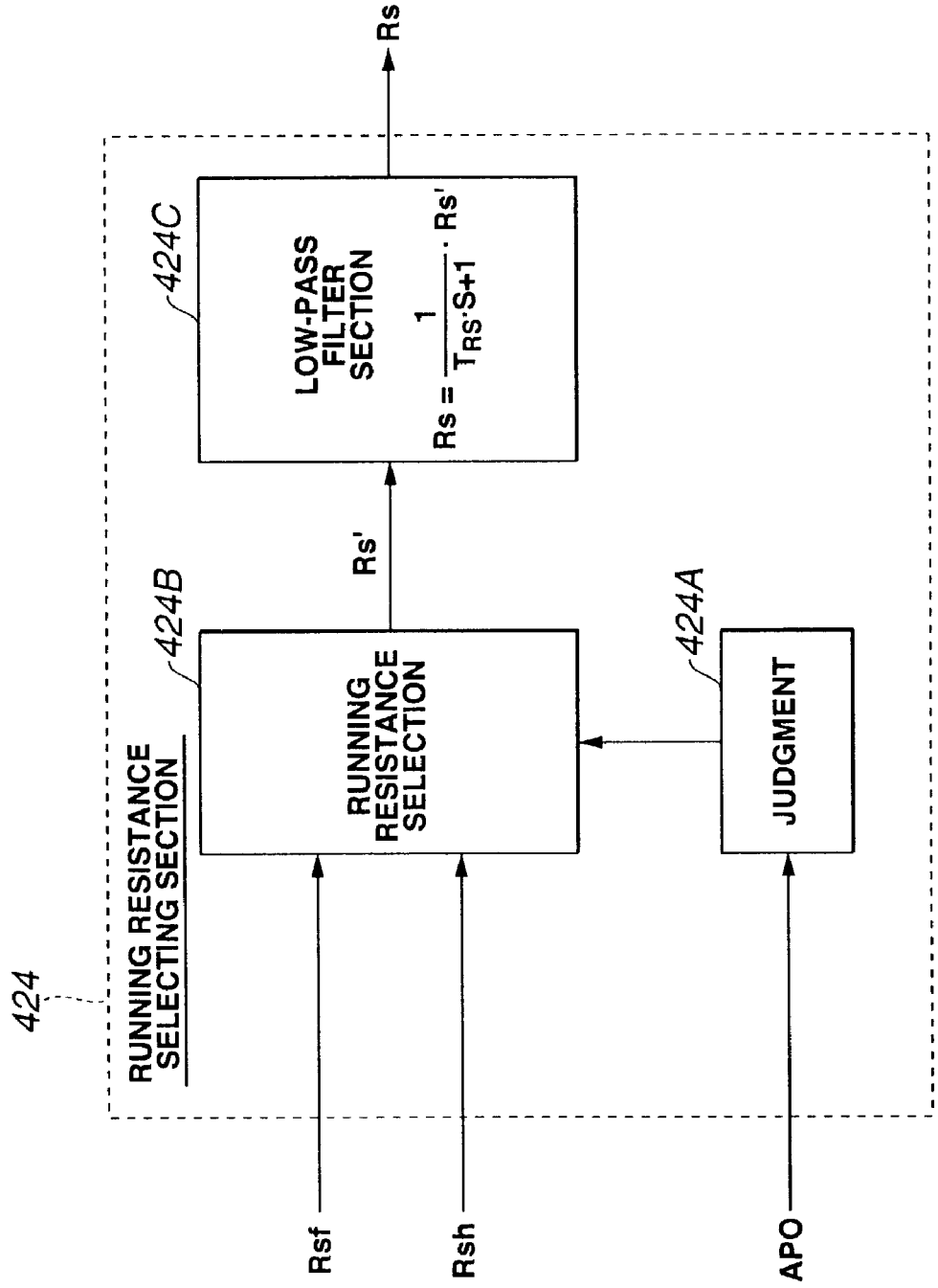
FIG. 16 is a functional block diagram showing a running resistance selecting section shown in FIG. 10.

Running resistance selecting section 424 shown in FIG. 10 receives accelerator pedal depression quantity APO, and selects, as final running resistance Rs, one of flat road running resistance Rsf and modified running resistance Rsh adapted to the road gradient. As shown in FIG. 16, running resistance selecting section 424 of this example is composed of a running resistance changeover judging section 424A, a running resistance selector section 424B, and a low-pass filter section 424C.

Figure 17:
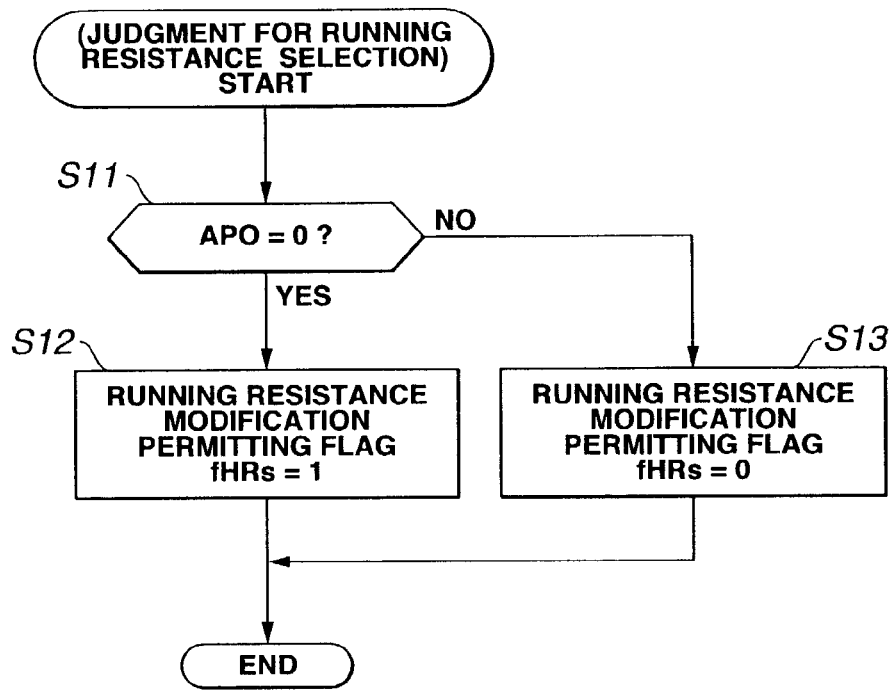
FIG. 17 is a flowchart showing a control program performed by a judging section in the running resistance selecting section of FIG. 16.

Running resistance changeover judging section 424A performs a process shown in FIG. 17, to determine whether to permit changeover from flat road running resistance Rsf to the road gradient adapted running resistance Rsh, in dependence on accelerator pedal depression quantity APO. At step S11, judging section 424A examines whether accelerator pedal depression quantity APO is equal to zero or not. When accelerator pedal depression quantity APO is in a minimum setting region indicating that the accelerator pedal is released, the judging section 424A proceeds from step S1 to step S12, and sets a running resistance changeover permission flag fHRs to one to permit changeover from flat road running resistance Rsf to the road gradient adapted running resistance Rsh. When accelerator pedal depression quantity APO is in a non-zero condition indicating that the accelerator pedal is depressed, the judging section 424A proceeds from step S11 to step S13, and resets the running resistance changeover permission flag fHRs to zero to inhibit changeover from flat road running resistance Rsf to the road gradient adapted running resistance Rsh.

Figure 18:
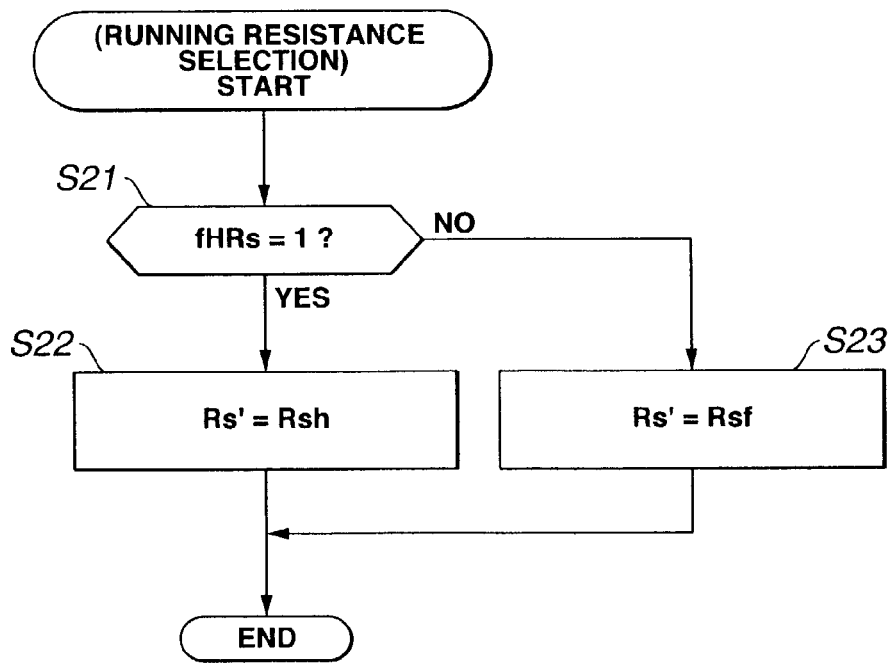
FIG. 18 is a flowchart showing a control program performed by a running resistance selector section in the running resistance selecting section of FIG. 16.

Running resistance selector section 424B shown in FIG. 16 performs a control program shown in FIG. 18. At step S21, selector section 424B examines whether running resistance changeover permission flag fHRs is equal to one or not. When permission flag fHRs is one, indicating the permission of running resistance changeover, then the selector section 214B employs, as a before-filter running resistance Rs', the modified running resistance Rsh at step S22 (Rs'=Rsh). When permission flag fHRs is zero indicating that the changeover to modified running resistance Rsh is not permitted, then the before-filter running resistance Rs' is set equal to flat road running resistance Rsf at step S23 (Rs'=Rsf).

The thus-determined before-filter running resistance Rs' is supplied, as shown in FIG. 16, to low-pass filter section 424C to bring the calculated running resistance closer to the actual running resistance of the actual vehicle. Low-pass filter section 424C calculates final running resistance Rs from before-filter running resistance Rs' by using a low-pass filter expressed as;

$$R_S = \frac{1}{T_{Rs} \cdot s + 1} \cdot R'_s \qquad \text{MATH 16}$$

where TRs is a first order lag time constant.

Then, as shown in FIG. 10, a subtracting section (or a target acceleration modifying section) 426 subtracts final running resistance Rs from target acceleration tACC, and thereby determines a modified target acceleration tACC' modified in accordance with estimated disturbance dv' (road gradient)(tACC'=tACC−Rs). As evident from explanation on running resistance correction coefficient KRSf shown in FIG. 13, and running resistance correction quantity OffRsf shown in FIG. 15, modified target acceleration tACC' represents a vehicle deceleration to provide target vehicle speed tVSP to achieve optimum coating deceleration adapted to estimated disturbance dv' (road gradient).

As shown in FIG. 10, modified target acceleration tACC' is supplied to integrating section 421. Integrating section 421 (section for calculating a target vehicle speed) further receives vehicle speed aVSP and driving force control permission flag fSTART, and calculates target vehicle speed tVSP in accordance with control permission flag fSTART, actual vehicle speed aVSP and modified target acceleration tACC' by performing a control program shown in FIG. 19.

Step S31 determines whether control permission flag fSTART is equal to 1 or not. When driving force control switch 21 is ON and brake switch 20 is OFF (the brake is inoperative), and hence control permission flag fSTART is equal to one, then integrating section 421 proceeds from step S31 to step S32. At step S32, integrating section 421 sets a current value of target vehicle speed tVSP equal to a sum of previous target vehicle speed tVSPprevious and modified target acceleration tACC' (tVSP=tVSPprevious+tACC'), and updates previous target vehicle speed tVSPprevious to the current value of target vehicle speed obtained by this control cycle (tVSPprevious=tVSP). The target vehicle speed tVSP newly calculated in this way is delivered to the before-mentioned target driving force calculating section 50 (shown in FIG. 2), and fed back to target transmission ratio setting section 403 and engine speed converting section 430 (as shown in FIG. 4) for use in calculation of target acceleration tACC.

When control permission flag fSTART is equal to zero, that is when driving force control switch 21 is OFF or brake switch 20 is ON (during braking), then control is transferred from step S31 to step S33 for initialization. Step S33 sets the actual vehicle speed aVSP to current target vehicle speed tVSP (tVSP=aVSP) and further sets actual vehicle speed aVSP to the previous target vehicle speed tVSPprevious (that is, a target vehicle speed value calculated in a previous control cycle; tVSPprevious=aVSP).

The driving force control apparatus according to this embodiment thus determines target acceleration tACC in accordance with target engine torque tTE and target transmission ratio rRATIO determined from accelerator depression quantity APO, as shown in FIG. 4; calculates flat road running resistance Rsf from target vehicle speed tVSP and modified running resistance Rsh adapted to estimated disturbance dv' (road gradient); uses the modified running resistance Rsh as final running resistance Rs, when the accelerator pedal is in the released state (APO is equal to minimum setting); calculates modified target acceleration tACC' by subtracting final running resistance Rs from the above-mentioned target acceleration tACC, and target vehicle speed tVSP by integrating the modified target acceleration tACC'; and control the driving force of the vehicle by controlling the actual throttle opening of engine 1 and the actual transmission ratio of continuously-variable transmission 2 so as to reduce a deviation of actual vehicle speed aVSP from the target vehicle speed tVSP. Therefore, the following effects can be obtained.

Figure 20:
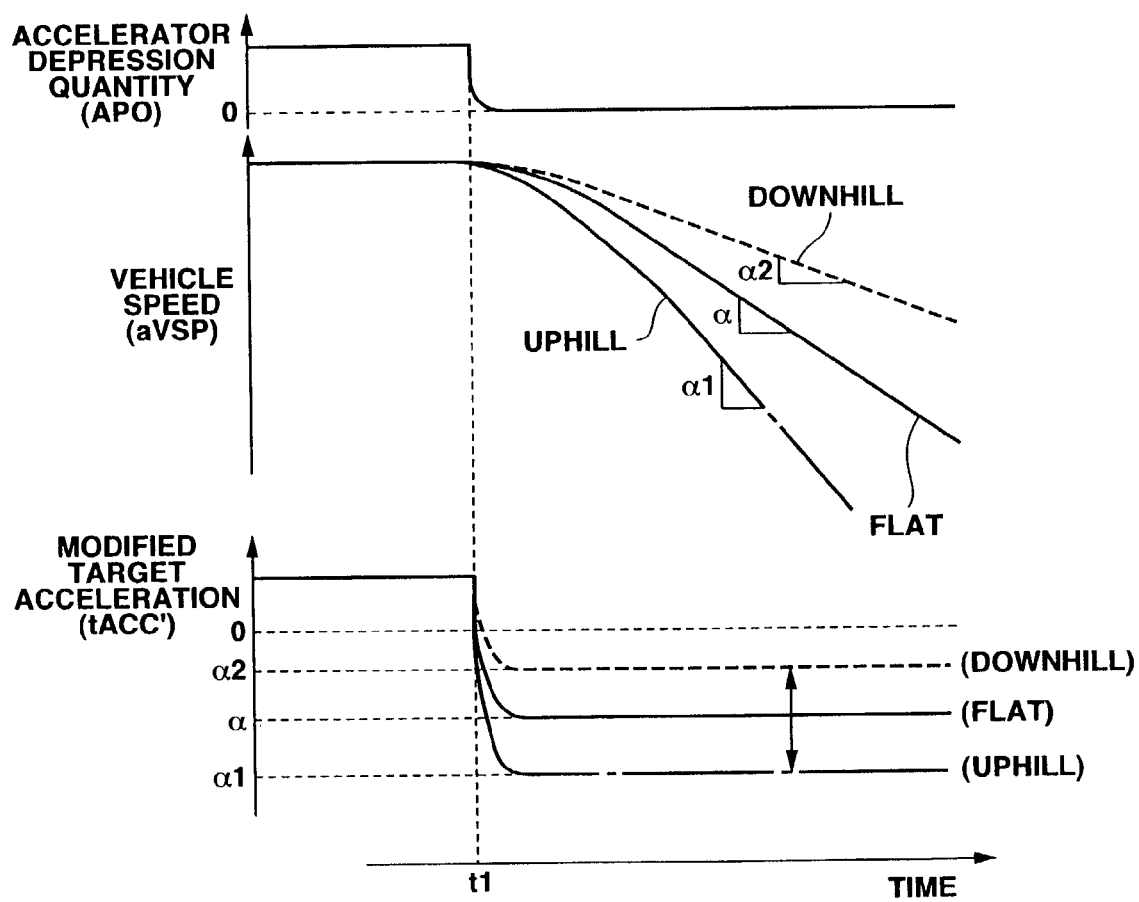
FIG. 20 is a time chart showing time variation of a deceleration of the vehicle equipped with the driving force control apparatus shown in FIGS. 1~19 when the accelerator pedal is released in a flat road running state, an uphill running state and a downhill running state.
Figure 21A:
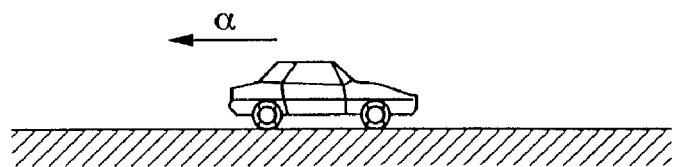
FIGS. 21A, 21B and 21C are views illustrating the deceleration produced by the driving force control apparatus shown in FIGS. 1~19 when the accelerator pedal is released in the flat road running state (FIG. 21A), in the uphill running state (FIG. 21B) and in the downhill running state (FIG. 21C).
Figure 21B:
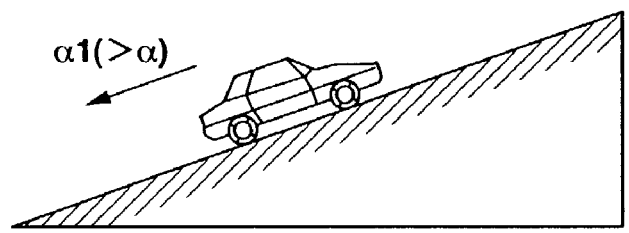
Figure 21C:
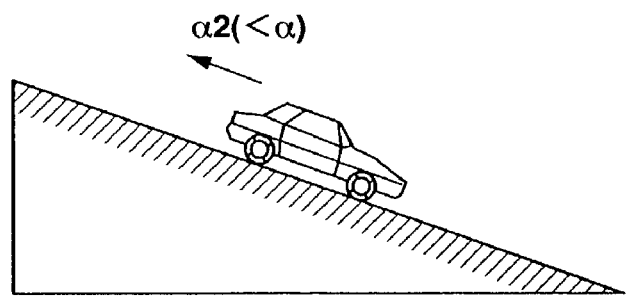

Target acceleration tACC is modified in accordance with the road gradient in the mode determined by the characteristic of correction coefficient KRSf shown in FIG. 13, or the characteristic of correction quantity OffRsf in FIG. 15, and the vehicle driving force is controlled so as to achieve the thus-determined modified target acceleration tACC'. Therefore, the control apparatus can control the driving force adequately when the accelerator pedal is released in a flat road running state as shown in FIG. 21A, an uphill running state as shown in FIG. 21B and a downhill running state as shown in FIG. 21C. The deceleration is held at a in the case of accelerator pedal being released in the flat road running state. In the case of accelerator pedal being released in the uphill running state shown in FIG. 21B, the modified target acceleration tACC' is set to a greater deceleration α1 greater than the deceleration a in the flat road running state, as shown in FIG. 20, and this control apparatus controls the driving force so as to achieve the greater deceleration α1. In the case of accelerator pedal being released in the downhill running state shown in FIG. 21C, the modified target acceleration tACC' is set to a smaller deceleration α2 smaller than the deceleration a in the flat road state, as shown in FIG. 20, and this control apparatus controls the driving force so as to achieve the smaller deceleration α2.

When the driver releases the accelerator pedal in an uphill running state, the driver foresees a greater deceleration. Therefore, the generation of greater deceleration does not cause unnatural feeling to the driver. When the driver releases the accelerator pedal in an downhill running state, the driver foresees a smaller deceleration. Therefore, the generation of smaller deceleration does not cause unnatural feeling to the driver.

In this embodiment, the modified running resistance Rsh is determined by modifying flat road running resistance Rsf with estimated disturbance dv' (road gradient), and used for modification of the target acceleration. Therefore, the control apparatus is not required to store data on the running resistance besides the data of flat road running resistance Rsf shown in FIG. 11. There is no need to save data on running resistance for each of values of the road gradient, so that the required memory capacity is reduced.

Moreover, the control apparatus according to this embodiment can readily calculate modified running resistance Rsh by using running resistance correction coefficient KRsf or running resistance correction quantity OffRsf. In either case, the control apparatus of the illustrated example refrains from modification of target acceleration tACC when the estimated disturbance dv' (road gradient) is in the small region between ±dv'1 as shown in FIG. 13 and FIG. 15. Therefore, the control apparatus can prevent useless control action for modification of target acceleration when the road gradient is too small for the driver to perceive.

While the accelerator pedal is depressed, the modification of target acceleration is not performed in effect by using the flat road running resistance Rsf as estimated running resistance without modification. Therefore, in the case of transition from the flat road running state to the uphill or downhill running state with the accelerator pedal being held depressed, this control system can continue the uphill or downhill running operation, adequately maintaining the vehicle speed in the flat road running state.

Figure 19:
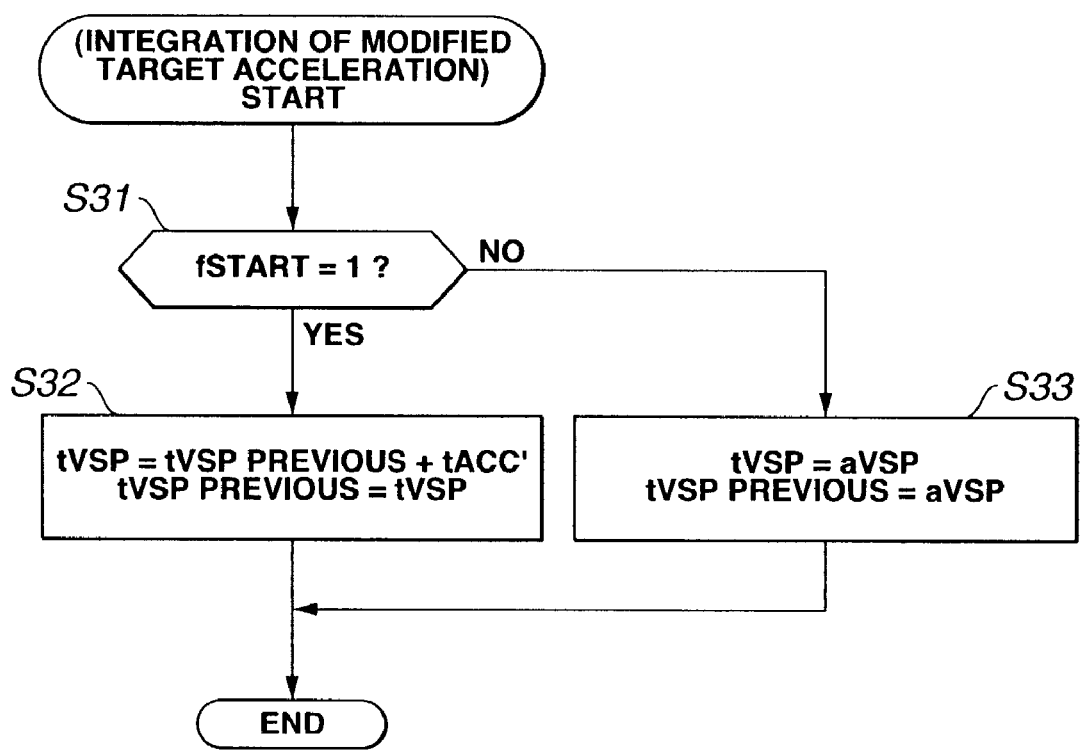
FIG. 19 is a flowchart showing an integrating process performed by an integrating section shown in FIG. 10, for integrating a modified target acceleration.

The control apparatus according to the illustrated embodiment is configured to determine target vehicle speed tVSP by integrating modified target acceleration tACC' as shown in FIG. 19, and to control the vehicle driving force so as to cause the actual vehicle speed to follow target vehicle speed. However, the control apparatus according to the present invention may be arranged to determine the actual vehicle acceleration by calculation or with a sensor, and to control the driving force of the vehicle by controlling the throttle opening of engine 1 and the transmission ratio of continuously-variable transmission 2, so as to cause the actual vehicle acceleration to follow the modified target acceleration tACC'. In this case, the control system can provide the same effects without the need for calculating the target vehicle speed from the target acceleration.

This application is based on prior Japanese Patent Application No.2001-294334 filed in Japan on Sep. 26, 2001. The entire contents of this prior Japanese Patent Application are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle driving force control apparatus for a vehicle, comprising:
    an actuating section configured to control a driving force of the vehicle to achieve a target acceleration;
    a running resistance estimating section configured to calculate an estimated running resistance; and
    a target acceleration modifying section configured to modify the target acceleration with the estimated running resistance, wherein the target acceleration modifying section decreases the target acceleration with an increase in the estimated running resistance,
    wherein the target acceleration modifying section decreases the target acceleration by subtracting the estimated running resistance from an unmodified target acceleration.

2. The vehicle driving force control apparatus as claimed in claim 1, further comprising a target acceleration calculating section to calculate the target acceleration from a target engine torque and a target transmission ratio determined in accordance with an accelerator input.

3. The vehicle driving force control apparatus as claimed in claim 1, further comprising a target vehicle speed calculating section to calculate a target vehicle speed by integrating the target acceleration, wherein the actuating section controls the driving force of the vehicle to achieve the target vehicle speed.

4. The vehicle driving force control apparatus as claimed in claim 3, wherein the running resistance estimating section is configured to calculate a flat road running resistance from the target vehicle speed, and to determine the estimated running resistance by modifying the flat road running resistance with a road gradient.

5. The vehicle driving force control apparatus as claimed in claim 4, wherein the running resistance estimating section is configured to determine the estimated running resistance by multiplying the flat road running resistance by a running resistance correction coefficient determined in accordance with the road gradient.

6. The vehicle driving force control apparatus as claimed in claim 5, wherein the running resistance correction coefficient is held equal to one when the road gradient is in a small gradient region.

7. The vehicle driving force control apparatus as claimed in claim 4, wherein the running resistance estimating section is configured to determine the estimated running resistance by modifying the flat road running resistance by a running resistance correction quantity determined in accordance with the road gradient.

8. The vehicle driving force control apparatus as claimed in claim 7, wherein the running resistance correction quantity is held equal to zero when the road gradient is in a small gradient region.

9. The vehicle driving force control apparatus as claimed in claim 4, the running resistance estimating section is configured to determine the estimated running resistance by modifying the flat road running resistance with the road gradient when the accelerator input is in a minimum setting region, and to set the estimated running resistance equal to the flat road running resistance without modification when the accelerator input is greater than the minimum setting region.

10. The vehicle driving force control apparatus as claimed in claim 1, wherein the running resistance estimating section is configured to calculate the estimated running resistance of the vehicle in accordance with a first parameter representing a vehicle speed and a second parameter representing a road gradient.

11. A vehicle driving force control apparatus for a vehicle, comprising:
    an actuating section configured to control a driving force of the vehicle to achieve a target acceleration;
    a running resistance estimating section configured to calculate an estimated running resistance; and
    a target acceleration modifying section configured to modify the target acceleration with the estimated running resistance, wherein the target acceleration modifying section decreases the target acceleration with an increase in the estimated running resistance,
    wherein the running resistance estimating section is configured to calculate the estimated running resistance of the vehicle in accordance with a first parameter representing a vehicle speed and a second parameter representing a road gradient; and
    wherein the vehicle driving force control apparatus further comprises a target acceleration calculating section to calculate an unmodified target acceleration in accordance with a driver's accelerator input represented by an accelerator pedal depression quantity, and wherein the target acceleration modifying section determines a modified target acceleration by subtracting the estimated running resistance from the unmodified target acceleration, and the actuating section controls the driving force of the vehicle to achieve the modified target acceleration.

12. The vehicle driving force control apparatus as claimed in claim 11, further comprises a road gradient estimating section to calculate the second parameter representing the road gradient in accordance with an actual vehicle speed.

13. The vehicle driving force control apparatus as claimed in claim 12, further comprises a target driving force calculating section to calculate a target driving force to control the actuating section so as to achieve the target acceleration, and the road gradient estimating section calculates the second parameter representing the road gradient in accordance with the target driving force and the actual vehicle speed.

14. The vehicle driving force control apparatus as claimed in claim 13, further comprising a target vehicle speed calculating section to calculate a target vehicle speed in accordance with the target acceleration; wherein the road gradient estimating section is a robust compensator in the target driving force calculating section and the target driving force calculating section further comprises a model matching compensator to calculate a command driving force in accordance with the target vehicle speed, and the target driving force calculating section determines the target driving force by adding the second parameter representing the road gradient determined by the robust compensator, to the command driving force determined by the model matching compensator.

15. A vehicle driving force control apparatus for controlling a driving force of a vehicle:
- first means for calculating a target acceleration in accordance with a driver's accelerator input;
- second means for calculating an estimated running resistance;
- third means for calculating a modified target acceleration by modifying the target acceleration determined by the first means, with the estimated running resistance so that the modified target acceleration decreases as the estimated running resistance increases; and
- fourth means for controlling the driving force of the vehicle so as to achieve the modified target acceleration,
- wherein the third means calculates the modified target acceleration by subtracting the estimated running resistance from an unmodified target acceleration.

16. A vehicle driving force control process for controlling a driving force of a vehicle, comprising:
- calculating a target acceleration in accordance with a driver's accelerator input;
- determining an estimated running resistance;
- modifying the target acceleration with the estimated running resistance, to determine a modified target acceleration such that the modified target acceleration decreases as the estimated running resistance increases; and
- controlling the driving force of the vehicle so as to achieve the modified target acceleration,
- wherein the step of modifying the target acceleration derives the modified target acceleration by subtracting the estimated running resistance from an unmodified target acceleration.

* * * * *